United States Patent
Lee

(10) Patent No.: US 10,693,822 B2
(45) Date of Patent: Jun. 23, 2020

(54) MESSAGE PROVIDING METHODS AND APPARATUSES, DISPLAY CONTROL METHODS AND APPARATUSES, AND COMPUTER-READABLE MEDIUMS STORING COMPUTER PROGRAMS FOR EXECUTING METHODS

(71) Applicant: LINE Corporation, Shibuya-ku, Tokyo (JP)

(72) Inventor: Il Gu Lee, Tokyo (JP)

(73) Assignee: LINE Corporation, Tokyo (JP)

(*) Notice: Subject to any disclaimer, the term of this patent is extended or adjusted under 35 U.S.C. 154(b) by 661 days.

(21) Appl. No.: 15/185,555

(22) Filed: Jun. 17, 2016

(65) Prior Publication Data

US 2017/0118152 A1 Apr. 27, 2017

(30) Foreign Application Priority Data

Oct. 27, 2015 (KR) .......................... 10-2015-0149717

(51) Int. Cl.
| | |
|---|---|
| *G06F 3/048* | (2013.01) |
| *H04L 12/58* | (2006.01) |
| *G06F 16/34* | (2019.01) |
| *G06F 40/134* | (2020.01) |
| *G06F 40/279* | (2020.01) |

(Continued)

(52) U.S. Cl.
CPC ............ *H04L 51/12* (2013.01); *G06F 3/0485* (2013.01); *G06F 16/345* (2019.01); *G06F 40/134* (2020.01); *G06F 40/279* (2020.01); *H04L 51/04* (2013.01); *H04L 51/16* (2013.01); *H04L 51/18* (2013.01); *H04L 67/02* (2013.01); *H04L 67/20* (2013.01)

(58) Field of Classification Search
CPC ......... H04L 51/04; H04L 51/16; H04L 51/18; G06F 17/2235; G06F 17/30719; G06F 3/048; G06F 15/16; G06F 17/30
See application file for complete search history.

(56) References Cited

U.S. PATENT DOCUMENTS

| | | | | |
|---|---|---|---|---|
| 5,708,825 | A * | 1/1998 | Sotomayor | ......... G06F 17/2235 707/E17.013 |
| 6,346,952 | B1 | 2/2002 | Shtivelman | |

(Continued)

FOREIGN PATENT DOCUMENTS

| | | |
|---|---|---|
| CN | 101611398 A | 12/2009 |
| CN | 103841525 A | 6/2014 |

(Continued)

OTHER PUBLICATIONS

Office Action for Korean Application No. 10-2015-0149717 dated Sep. 23, 2016.

(Continued)

*Primary Examiner* — Mahelet Shiberou
(74) *Attorney, Agent, or Firm* — Harness, Dickey & Pierce, P.L.C.

(57) ABSTRACT

A message providing method includes: extracting a keyword from a message; searching a list of messages to extract a related message associated with the keyword, the messages communicated between a user and a conversational partner or between the user and a third party; and linking the related message to the keyword by a hyperlink.

11 Claims, 13 Drawing Sheets

(51) Int. Cl.
*G06F 3/0485* (2013.01)
*H04L 29/08* (2006.01)

(56) References Cited

U.S. PATENT DOCUMENTS

| | | | | |
|---|---|---|---|---|
| 7,506,263 | B1* | 3/2009 | Johnston | G06Q 10/107 |
| | | | | 709/206 |
| 7,886,012 | B2* | 2/2011 | Bedi | G06Q 10/107 |
| | | | | 709/204 |
| 9,043,410 | B2* | 5/2015 | MacDonald | H04L 51/16 |
| | | | | 709/206 |
| 9,116,984 | B2 | 8/2015 | Caldwell et al. | |
| 2005/0289220 | A1* | 12/2005 | Chen | H04L 12/1827 |
| | | | | 709/206 |
| 2006/0107220 | A1* | 5/2006 | Letkeman | G06F 17/241 |
| | | | | 715/751 |
| 2007/0027839 | A1* | 2/2007 | Ives | G06F 16/9577 |
| 2008/0201434 | A1 | 8/2008 | Holmes et al. | |
| 2008/0282159 | A1* | 11/2008 | Vanderwende | G06F 16/345 |
| | | | | 715/700 |
| 2009/0061915 | A1* | 3/2009 | Bong | G06Q 10/10 |
| | | | | 455/466 |
| 2009/0077548 | A1 | 3/2009 | Kelley et al. | |
| 2009/0112720 | A1* | 4/2009 | Close | G06Q 10/107 |
| | | | | 705/14.26 |
| 2009/0150397 | A1* | 6/2009 | Chen | G06F 16/955 |
| 2009/0235150 | A1* | 9/2009 | Berry | G06F 16/48 |
| | | | | 715/205 |
| 2010/0011072 | A1* | 1/2010 | Mishchenko | G06Q 10/10 |
| | | | | 709/206 |
| 2010/0279667 | A1 | 11/2010 | Wehrs et al. | |
| 2012/0110090 | A1* | 5/2012 | Jensen | G06Q 10/107 |
| | | | | 709/206 |
| 2012/0179449 | A1* | 7/2012 | Raskino | G06F 16/345 |
| | | | | 704/2 |
| 2014/0143684 | A1 | 5/2014 | Oh et al. | |
| 2014/0280647 | A1 | 9/2014 | Gehman et al. | |
| 2014/0280653 | A1* | 9/2014 | DeLuca | H04L 51/046 |
| | | | | 709/206 |
| 2015/0177974 | A1 | 6/2015 | Lu et al. | |
| 2015/0293670 | A1 | 10/2015 | Kim et al. | |
| 2016/0147387 | A1* | 5/2016 | Rahman | G06F 17/30705 |
| | | | | 715/752 |
| 2016/0191453 | A1* | 6/2016 | Thomas | H04W 4/12 |
| | | | | 709/206 |
| 2017/0090718 | A1* | 3/2017 | Chen | H04L 51/04 |

FOREIGN PATENT DOCUMENTS

| | | |
|---|---|---|
| CN | 104734940 A | 6/2015 |
| CN | 104866463 A | 8/2015 |
| KR | 101267006 B1 | 5/2013 |
| KR | 10-2013-0097970 A | 9/2013 |
| KR | 20150106481 A | 9/2015 |
| KR | 20150118405 A | 10/2015 |
| TW | I255132 B | 5/2006 |

OTHER PUBLICATIONS

Naver Blog, "Using Hash Tags," <URL: <http://blog.naver.com/karty/70080204624>>, Feb. 10, 2010 and English translation.

Taiwanese Office Action for Taiwanese Application No. 105133585 dated Feb. 7, 2018 and English translation thereof.

Office Action dated Feb. 3, 2019 in Chinese Application No. 201610951375.5.

Notice of Final Rejection dated Jan. 21, 2019 in Korean Patent Application No. 10-2018-0035253.

* cited by examiner

MESSAGE PROVIDING METHODS AND APPARATUSES, DISPLAY CONTROL METHODS AND APPARATUSES, AND COMPUTER-READABLE MEDIUMS STORING COMPUTER PROGRAMS FOR EXECUTING METHODS

CROSS-REFERENCE TO RELATED APPLICATION

This application claims priority under 35 U.S.C. § 119 to Korean Patent Application No. 10-2015-0149717, filed on Oct. 27, 2015, in the Korean Intellectual Property Office, the disclosure of which is incorporated herein in its entirety by reference.

BACKGROUND

Field

One or more example embodiments relate to message providing methods, message providing apparatuses, display control methods, display control apparatuses, and/or computer-readable mediums storing one or more computer programs for executing one or more methods.

Description of the Related Art

With rapid development of information and communication technology, various types of terminals such as mobile communication terminals or personal computers are implemented to perform various functions.

In one example, a mobile communication terminal has been implemented to use various functions such as data communication, image and/or video capture using a camera, music or video file playback, gaming, broadcast watching, etc., in addition to a default voice communication function.

Moreover, the development of technology for increasing the number of functions that may be executed in the terminal has been continuous. This development is focused on software improvement technology in addition to hardware improvement technology.

Recently, the frequency of use of messenger programs that hold a conversation by accessing a communication network using such a terminal and then transmitting and receiving messages to and from a plurality of users has been continuously increasing.

When details of the conversation sometimes need to be checked upon use of the messenger program, users had to move directly to a position where there is a corresponding conversation history in a corresponding chat room. In order to remove such an inconvenience, a conversation history search function or the like has been provided. However, this function is also inconvenient because the users must choose and enter keywords.

Korean Patent Unexamined Publication No. 10-2013-0097970, entitled "METHOD AND APPARATUS FOR PROVIDING CHATTING SERVICE" and published on Sep. 4, 2013, which is an example of a message program, discloses a function of inserting a status message entered by a conversational partner into an input area of a chat room screen in the form of a quotation. However, since the quotation is not based on conversation details, but on the status message entered by the conversational partner, users may still be inconvenienced by choosing and entering the keyword in order to search for desired conversation details.

In addition, since the conversation details are arranged in chronological order, users may be inconvenienced by having to read the entirety of a part containing a corresponding conversation history again in order to view all conversation details for any one topic. Furthermore, in order to share such a conversation detail, a relatively cumbersome process such as screen capture or content copy and paste is required.

SUMMARY

One or more example embodiments provide message providing methods, message providing apparatuses, display control methods, display control apparatuses, and computer-readable mediums storing one or more computer programs for executing one or more methods.

One or more example embodiments provide message providing methods and apparatuses that extract a keyword from a message input by a user, extract a related message associated with the keyword, and provide the related message to a message recipient in addition to the input message, a display control method and apparatus, and a computer program for executing one of the methods.

One or more embodiments include a message providing method and apparatus that summarize one or more conversations to generate a summary message and provide a related message associated with a keyword contained in the summary message to a recipient in addition to the summary message, a display control method and apparatus, and a computer program for executing one of the methods.

One or more embodiments include a display control method and apparatus that provide various user interfaces for enhancing the legibility of the related message associated with the received message, and a computer program for executing the method.

At least one example embodiment provides a non-transitory computer-readable storage medium storing computer-executable instructions that, when executed by processing circuitry, cause the processing circuitry to perform a message providing method comprising: extracting a keyword from a message; searching a list of messages to extract a related message associated with the keyword, the messages communicated between a user and a conversational partner or between the user or the conversational partner and a third party; and linking the related message to the keyword by a hyperlink.

The message may be a summary message, The extracting of a keyword may include: receiving, from a user terminal, identification information of one or more messages from among the list of messages; summarizing the one or more messages based on the identification information to generate the summary message; and extracting the keyword from the summary message.

The message providing method may further include linking the related message to the keyword extracted from the summary message to provide the summary message to the user terminal.

The message providing method may further include receiving a correction of the summary message from the user terminal.

The message providing method may further include: receiving a message transmission request signal from the user terminal; and transmitting the summary message including the hyperlink to another user terminal in response to the message transmission request signal.

The message providing method may further include providing the summary message to the user terminal.

At least one other example embodiment provides a non-transitory computer-readable storage medium storing computer-executable instructions that, when executed on processing circuitry, cause the processing circuitry to perform a display control method comprising: receiving a message containing at least one keyword, the at least one keyword linked to a first related message associated with the at least one keyword by a first hyperlink; displaying the message on a screen; and displaying the first related message in response to activation of the first hyperlink, wherein the a first related message is extracted from a list of messages communicated between a sender of the message and a user or between the sender or the user and a third party.

The displaying the first related message may include: scrolling, when the first related message is written by the sender of the message or the user, to a part where the first related message is present in a graphic user interface (GUI) in which a conversation has been made between the sender of the message and the user; and highlighting the first related message.

The displaying the first related message may include displaying, on the GUI, remaining messages other than the first related message among the messages between the sender and the user, so that the remaining messages are distinct from the first related message.

The method may further include performing at least one of blurring, black and white processing, and fading on the remaining messages so that the remaining messages are distinct from the first related message.

The displaying the first related message may include displaying a pop-up window including the first related message.

The displaying the first related message may include sequentially displaying a plurality of related messages in order of a plurality of associated keywords in the message.

The first related message may include a second hyperlink, and the method further includes displaying a second related message linked by the second hyperlink.

At least one other example embodiment provides a message providing apparatus comprising processing circuitry configured to execute computer-readable instructions such that the processing circuitry is configured to: extract a keyword from a message; search a list of messages to extract a related message associated with the keyword, the messages communicated between a user and a conversational partner or between the user or the conversational partner and a third party; and link the related message to the keyword by a hyperlink.

The message may be a summary message. The processing circuitry may be configured to execute computer-readable instructions such that the processing circuitry is further configured to: receive, from a user terminal, identification information of one or more messages from among the list of messages; summarize the one or more messages based on the identification information to generate a summary message; and extract a keyword contained in the summary message.

The processing circuitry may be configured to execute computer-readable instructions such that the processing circuitry is further configured to provide the summary message to the user terminal.

The apparatus may further include a receiver configured to receive a correction of the summary message from the user terminal. The receiver may be further configured to receive a message transmission request signal from the user terminal; and the processing circuitry is configured to execute computer-readable instructions such that the processing circuitry is further configured to transmit the summary message including the hyperlink to another user terminal in response to the message transmission request signal.

At least one other example embodiment provides a display control apparatus comprising: a receiver configured to receive a message containing at least one keyword, the at least one keyword linked to a related message associated with the at least one keyword by a hyperlink; and processing circuitry. The processing circuitry is configured to execute computer-readable instructions such that the processing circuitry is configured to: display the message on a screen; and display the related message in response to activation of the hyperlink by a user, the related message having been extracted from a list of messages communicated between a sender of the message and a user or between the sender or the user and a third party.

At least one other example embodiment provides a message providing method comprising: extracting a keyword from a message; searching a list of messages to extract a related message associated with the keyword, the messages communicated between a user and a conversational partner or between the user and a third party; and linking the related message to the keyword by a hyperlink.

At least one other example embodiment provides a display control method comprising: receiving a message containing at least one keyword, the at least one keyword linked to a related message associated with the at least one keyword by a hyperlink; displaying the message on a screen; and displaying the related message in response to activation of the hyperlink. The related message is extracted from a list of messages communicated between a sender of the message and a user or between the sender or the user and a third party.

The above and other aspect, features, and advantages of example embodiments will become apparent from the following description taken in conjunction with the accompanying drawings, claims, and detailed description.

These general and specific aspects may be carried out by using a system, a method, a computer program, or a combination thereof.

BRIEF DESCRIPTION OF THE DRAWINGS

These and/or other aspects will become apparent and more readily appreciated from the following description of example embodiments, taken in conjunction with the accompanying drawings in which.

DETAILED DESCRIPTION

Figure 1:
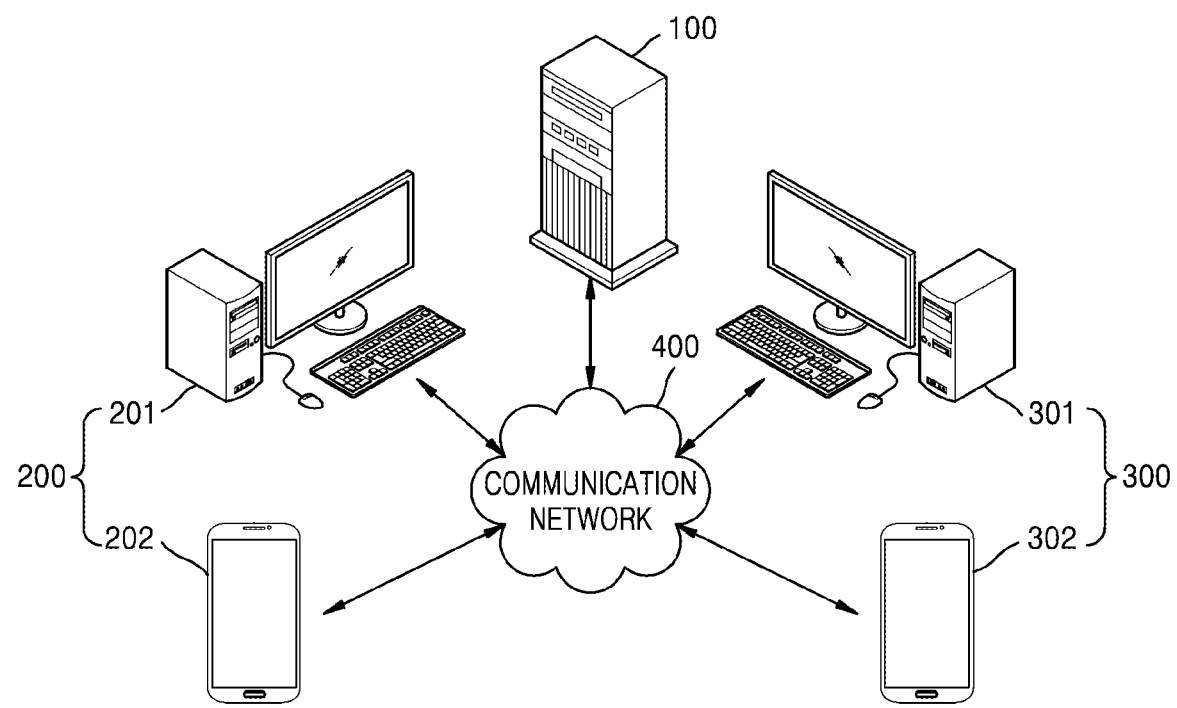
FIG. 1 is a view showing a configuration of a message providing system according to an example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 is a view showing a configuration of a message providing system according to an example embodiment.

Referring to FIG. 1, a message providing system according to an example embodiment provides a message transmission/reception service. The message providing system according to an example embodiment includes a server 100, a first user terminal 200, a second user terminal 300, and a communication network 400 that connects the server 100, the first user terminal 200, and the second user terminal 300.

The message providing system according to an example embodiment may provide a message transmission/reception program or a message transmission/reception web site to the first user terminal 200 and the second user terminal 300. The message providing system according to an example embodiment receives an input message or identification information of a summarization-designated message from the first user terminal 200 and transmits a related message associated with the input message or summary message to the second user terminal 300.

Referring to FIG. 1, the first user terminal 200 and the second user terminal 300 each denote a communication terminal that may use a web service in a wired/wireless communication environment. The first user terminal 200 may be a personal computer 201 or a mobile terminal 202. The second user terminal 300 may be a personal computer 301 or a mobile terminal 302. In FIG. 1, the mobile terminals 202 and 302 are shown as smartphones, but inventive concepts are not limited thereto. As described above, a terminal equipped with a web browsing application may be used without any limitations.

The first user terminal 200 and the second user terminal 300 each include a display that displays a screen, an input device that receives data from a user, and a communicator. The input device may include, for example, a keyboard, a track ball, a microphone, a button, a touch panel, etc., but is not limited thereto.

The communication network 400 serves to connect the server 100, the first user terminal 200, and the second user terminal 300. For example, the communication network 400 provides an access route to the server 100, the first user terminal 200, and the second user terminal 300. Thus, the server 100, the first user terminal 200, and the second user terminal 300 may access the communication network 400 to transmit or receive packet data. The communication network 400 may include, for example, wired networks such as local area networks (LANs), wide area networks (WANs), metropolitan area networks (MANs), and integrated services digital networks (ISDNs) or wireless networks such as wireless LANs, CDMA, Bluetooth, and satellite communication. However, example embodiments are not limited thereto.

The server 100 provides a web page that provides a message transmission/reception program and/or a message transmission/reception service to the first user terminal 200 and the second user terminal 300. For example, through the web page that provides a message transmission/reception program or a message transmission/reception service, the server 100 receives an input message or identification information of a message to be summarized from the first user terminal 200, extracts a related message associated with the input message or summary message, and transmits the extracted related message to the second user terminal 300.

Although not shown, the server 100 according to an example embodiment may include a memory, an input/output unit (or circuit), a program storage, a controller, and a communicator, etc. The memory functions to temporarily or permanently store data processed by the server 100. The memory may include a magnetic storage media or flash storage media. However, example embodiments are not limited thereto. The communicator may be a device including hardware and software needed to transmit and receive a signal such as a control signal or a data signal through wired/wireless connection with another network device. The controller may include any type of device that may process data, such as a processor. Here, in addition to that discussed above, the processor may denote, for example, a data processing device that is built into hardware and has a circuit physically structured to perform a function expressed in code or commands included in a program. As discussed above, the data processing device built into hardware may include, for example, a microprocessor, a central processing unit (CPU), a processor core, a multiprocessor, an application-specific integrated circuit (ASIC), a field programmable gate array (FPGA), etc. However, example embodiments are not limited thereto.

For convenience of description, a user who transmits an input message or transmits identification information of a message to be summarized and his/her terminal may be referred to as a first user and a first user terminal, respectively, and a user who receives the input message and its related message or the summary message and its related message and his/her terminal may be referred to as a second user and a second user terminal, respectively. However, although the terms "first," "second," etc. may be used herein to distinguish between the users to be described, the users should not be limited by these terms. For example, the second user may also transmit an input message or transmit identification information of a summarization-designated message, and the first user may also receive the input message and its related message or the summary message and its related message. However, for convenience, the following description is made on the assumption that the first user transmits an input message or transmits identification information of a summarization-designated message, and the second user receives the input message and its related message or receives the summary message and its related message.

Figure 2:
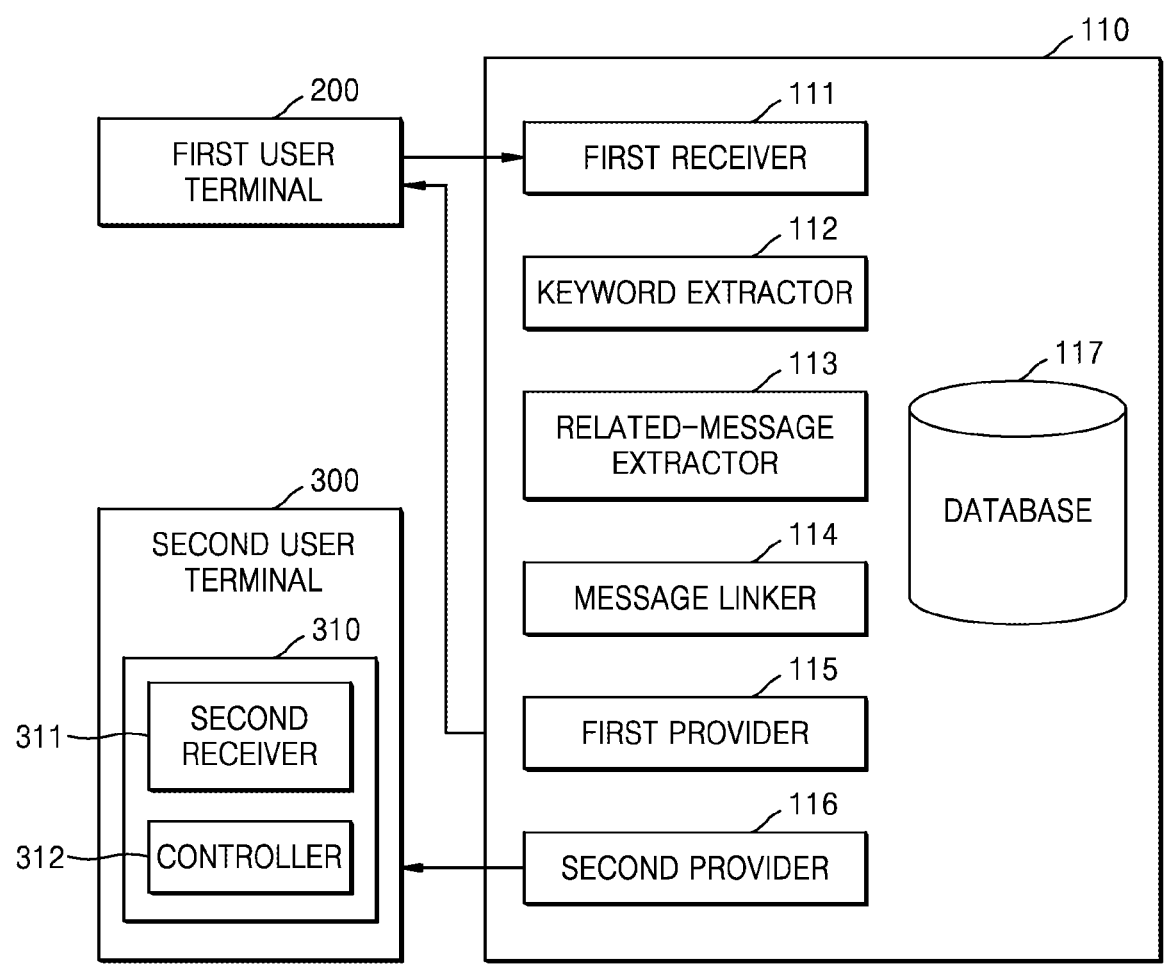
FIG. 2 is a block diagram showing an example configuration of a message providing apparatus included in a server of FIG. 1.

FIG. 2 is a block diagram showing an example configuration of a message providing apparatus 110 included in a server 100 of FIG. 1.

The message providing apparatus 110 according to an example embodiment may correspond to or include one or more processors. Thus, the message providing apparatus 110 may be driven while being included in another hardware device such as a microprocessor or a computer system. The message providing apparatus 110 may be included in the server 100. However, example embodiments are not limited thereto, and the message providing apparatus 110 may be included in the first user terminal 200 according to a design change.

The message providing apparatus 110 according to an example embodiment may include a first receiver 111, a keyword extractor 112, a related-message extractor 113, a message linker 114, a first provider 115, a second provider 116, and a database 117. However, the classification of components is based on convenience or functionality, and the components are not divided physically. Thus, a function performed by each component may be performed by other components, and some components may be removed and added to another component. For example, the first receiver 111, the first provider 115, and the second provider 116 may be integrated into one communication device or communication processor, and the keyword extractor 112, the related-message extractor 113, and the message linker 114 may be integrated into one controller or processor.

The first receiver 111 according to an example embodiment may receive an input message or identification message of one or more messages to be summarized from the first user terminal 200.

The input message includes a message entered into the first user terminal 200 by a user who intends to send the message.

The message to be summarized may include one or more messages selected from the first user terminal 200 and summarized by the user. The message to be summarized is a summarization-designated message selected by a user and may be selected from a list of existing messages that a user and a conversational partner have communicated with each other or that the user has communicated with a third party. The list of messages includes messages that the above-described user has communicated with a plurality of conversational partners including a partner to whom the user intends to send a message.

The first receiver 111 receives identification information of one or more messages that are selected from the first user terminal 200 and then summarized, that is, messages to be summarized. Here, the identification information may include an ID of a chat room and an ID of each message.

The keyword extractor 112 may summarize the messages to be summarized to generate a summary message, and the first provider 115 may provide the summary message to a first user. The summary message is a message obtained by summarizing one or more messages to be summarized, and will be described below in more detail. The first receiver 111 may receive corrections of the summary message from the first user terminal 200. The second provider 116 may provide the summary message having corrections reflected therein to the second user terminal 300.

The keyword extractor 112 according to an example embodiment extracts a keyword from the input message that the first receiver 111 has received from the first user terminal 200.

In this case, various techniques may be used by the keyword extractor 112 to extract the keyword from the input message. For example, the keyword extractor 112 may divide the input message into morphemes, and then extract only nouns as keywords. A morpheme is the smallest grammatical unit in a language; that is, the smallest meaningful unit of a language. Alternatively, the keyword extractor 112 may divide the input message into morphemes, and then extract only interrogative pronouns as keywords. Alternatively, the keyword extractor 112 may divide the input message into morphemes, and then extract only words indicating time as keywords. A group of interrogative pronouns or words indicating time may be provided prior to extracting the keyword (e.g., prestored).

For example, assume that a user named "Kim Gap-dong" and a user named "Park Eul-sun" have a conversation about "time and place of tomorrow's appointment," and then the user named "Park Eul-sun" enters a message "do you remember when and where we shall meet today?" into her own first user terminal 200. The keyword extractor 112 may extract the interrogative pronouns such as "when" or "what time" and "where" from the input message. Alternatively, the keyword extractor 112 may extract words indicating time, such as "today," from the input message.

The keyword extractor 112 according to another example embodiment may summarize a message to be summarized to generate a summary message by utilizing identification information of the message to be summarized, which is received by the first receiver 111, and may extract a keyword from the summary message.

In more detail, for example, the keyword extractor 112 may check a message matching the identification information of the message to be summarized from the database 117 by utilizing the identification information of the message to be summarized, which is received by the first receiver 111. The keyword extractor 112 may summarize one or more checked messages from the database 117 on the basis of the identification information to generate the summary message. In this case, various techniques may be used for the keyword extractor 112 to summarize the one or more messages to be summarized. For example, the keyword extractor 112 may divide the one or more messages to be summarized into morphemes, and then extract only nouns to generate the summary message, like the method of extracting the keyword. Alternatively, the keyword extractor 112 may divide the message to be summarized into morphemes, extract interrogative pronouns, and then extract words corresponding to answers of the extracted interrogative pronouns to generate the summary message. Furthermore, the keyword extractor 112 may extract well-known geographical terms, proper nouns, brand names, or the like from the message to be summarized to generate the summary message. The well-known geographical terms, proper nouns, brand names, or the like to be extracted may be stored prior to performing the extracting (e.g., prestored).

The keyword extractor 112 may extract a keyword from the summary message. A method of the keyword extractor 112 extracting a keyword from the summary message may be performed by the above-described example embodiment of the keyword extraction method.

For example, assume that a user named "Kim Gap-dong" and a user named "Park Eul-sun" have a conversation about "time and place of tomorrow's appointment," and then the user named "Park Eul-sun" summarizes the conversation about "time and place of tomorrow's appointment," and transmits the summarized conversation to the user named "Kim Gap-dong." In this case, when the user named "Park Eul-sun" selects a message "what time shall we meet?" of the user named "Kim Gap-dong," messages "three o'clock is good" and "where shall we meet?" of the user named "Park Eul-sun," and a message "at City Hall" of the user named "Kim Gap-dong" from the first user terminal 200 as the messages to be summarized, the first receiver 111 receives identification information of the four messages from the first user terminal 200. Here, the identification information may include an ID of a chat room and an ID of each message. The keyword extractor 112 may check a message matching the identification information of the message to be summarized from the database 117 by utilizing the identification information of the four messages. The keyword extractor 112 may generate a summary message "9/28/2015/City Hall/3 PM" using the checked messages. In addition, the keyword extractor 112 may extract "Sep. 28, 2015," "City Hall," and "3 PM" as the keywords.

The keyword extractor 112 may also use the identification information of the message to be summarized, which is received by the first receiver 111, to generate a plurality of summary messages. That is, for example, the keyword extractor 112 may generate one or more different summary messages using the same or substantially the same message to be summarized. The plurality of summary messages generated by the keyword extractor 112 may be transmitted to the first user terminal 200 by the first provider 115, and only one summary message selected by the user from the first user terminal 200 may be transmitted to the second user terminal 300 by the second provider 116.

When the partner to whom the user intends to send a message is a bot, the keyword extractor 112 may extract a keyword suitable for the bot from the message to be summarized or may add the keyword suitable for the bot to the summary message. For this, a separate keyword extraction rule for a case in which the partner is a bot may be stored prior to performing the extracting (e.g., prestored).

The term "bot" is an abbreviation of robot and denotes a tool for finding data required by a user. That is, for example, the keyword extractor 112 may summarize the message to be summarized, which is received by the first user terminal 200, in the form of a summary message suitable for the bot, that is, a message written in a grammar that may be understood by the bot by utilizing the identification information of the message to be summarized, and then transmit the summary message to the server 100. The bot may provide information regarding the summary message. In this case, the server 100 and the bot may be individual devices that are physically separated and may also be formed in different logical areas of the same device. However, this is merely an example, and inventive concepts are not limited thereto.

For example, the bot may be a chatterbot. The chatterbot is a computer program that is designed to simulate a conversation with a human being via auditory or textual methods. The chatterbot operates by detecting a specific word or phrase from a message received from the user and outputting a prepared answer corresponding to the specific word or phrase. In addition, the bot may be managed, for example, by a messenger service account that has been assigned to a specific celebrity, a company, or a shop for advertising or commercial purposes. As an example, the bot may include a bot that searches for and plays back music of a specific singer, a bot that searches for and reserves a movie, etc.

When the partner to whom the user intends to send a message is a bot, the keyword extractor 112 may summarize the message to be summarized to generate the summary message with reference to a recommended keyword stored in the database 117. A recommended keyword for each cluster of the bot may be stored in the database 117. The cluster is acquired by classifying bots according to roles of the bots and may include a restaurant bot duster, a trip bot duster, a weather bot duster, a translation bot cluster, etc. That is, for example, the database 117 may include a keyword for each of the dusters such as the restaurant bot duster, the trip bot cluster, and the weather bot cluster, and the keyword extractor 112 may summarize the message with reference to the database 117 and extract the keyword when the summary message that is transmitted to a bot belonging to a corresponding cluster is written.

For example, assume that a user named "Kim Gap-dong" and a user named "Park Eul-sun" have a conversation about "time and place of tomorrow's appointment," and then the user named "Park Eul-sun" intends to summarize the conversation about "time and place of tomorrow's appointment," and transmit the summarized conversation to "restaurant bot" in order to reserve a table in a restaurant near the appointed place. In this case, when the user named "Park Eul-sun" selects a message "what time shall we meet?" of the user named "Kim Gap-dong," messages "three o'clock is good" and "where shall we meet?" of the user named "Park Eul-sun," and a message "at City Hall" of the user named "Kim Gap-dong" from the first user terminal 200 as the messages to be summarized, the first receiver 111 receives identification information of the four messages from the first user terminal 200. The keyword extractor 112 may use the identification information of the four messages to check a message matching the identification information of the messages to be summarized from the database 117. The keyword extractor 112 may extract a keyword indicating a time, a place, and a date, such as "Sep. 28, 2015/City Hall/3 PM" with reference to the checked message and a keyword corresponding to a restaurant bot cluster including "restaurant bot" of the database 117 and add a suitable keyword to generate a summary message. In this case, "restaurants near here" of the keywords of the summary message is a keyword that is added by the keyword extractor 112 with reference to a keyword stored in the restaurant bot cluster of the database 117.

When the message to be summarized, which is checked from the database 117 using the identification information of the message to be summarized, which is received by the first receiver 111, includes multimedia entities such as an image, a video, and a sound, the multimedia entities may be merged into one entity. In this case, the keyword extractor 112 may extract any one entity among the multimedia entities included in the message to be summarized as "entity keyword." That is, for example, when the message to be summarized includes multimedia entities, the keyword extractor 112 may merge the multimedia entities included in the message to be summarized and may extract any one entity from the multimedia entities included in the message to be summarized as "entity keyword."

For example, when the message to be summarized includes a plurality of photographs, the keyword extractor 112 may combine the plurality of photographs in a longitudinal or lateral direction or may combine the plurality of photographs to sequentially show a plurality of images. The combined entity may be a still image or a moving image.

Even when a multimedia entity is included in an input message received from the first user terminal 200, the keyword extractor 112 may extract the entity as "entity keyword."

The related-message extractor 113 according to an example embodiment searches a list of messages that the user and the plurality of conversational partners have communicated with each other in the database 117 to extract a related message associated with the keyword extracted by the keyword extractor 112.

In this case, various techniques may be used for the related-message extractor 113 to extract the related message associated with the keyword. For example, the related-message extractor 113 may extract a message including the keyword as the related message, and may also extract the message including the keyword and its synonym as the related message. In this case, the related-message extractor 113 may use a dictionary database (e.g., a previously formed dictionary database) to extract the related message.

When the keyword is an interrogative pronoun as described above, the related-message extractor 113 may extract a message that may be an answer for the interrogative pronoun as the related message. In more detail, when an interrogative pronoun "when" is the keyword, the related-message extractor 113 may extract a message including "o'clock," "month," "day," and "tomorrow," which may be answers for "when," as the related message. In addition, when an interrogative pronoun "where" is the keyword, the related-message extractor 113 may extract a message including "place," "floor," "city," "district," and the stored (e.g., prestored) name of a well-known place, which may be answers for "where," as the related message. A standard for selecting a related message for each interrogative pronoun may be stored prior to performing the extracting (e.g., prestored). However, this is merely an example, and example embodiments are not limited thereto.

For example, as described above, assume that a user named "Kim Gap-dong" and a user named "Park Eul-sun" have a conversation about "time and place of tomorrow's appointment," and then the user named "Park Eul-sun" enters a message "do you remember when and where we shall meet today?" into her own first user terminal 200 on Sep. 28, 2015. Also, assume that the keyword extractor 112 extracts "when," "where," and "today" from the input message.

The related-message extractor 113 may search for a conversation about "Sep. 28, 2015" among conversations stored in the database 117 on the basis of the keyword "today" extracted by the keyword extractor 112. For example, the related-message extractor 113 searches for a conversation in which "Sep. 28, 2015" is expressed as "tomorrow," "after a week," etc., in consideration of a date on which the conversation was stored. When the user named "Kim Gap-dong" has transmitted a message "what time shall we meet tomorrow?" to the user named "Park Eul-sun" on Sep. 27, 2015, the related-message extractor 113 may extract a related message associated with the remaining keywords on the basis of a list of messages.

Subsequently, when the user named "Park Eul-sun" has transmitted messages "three o'clock is good" and "where shall we meet?" to the user named "Kim Gap-dong" in response to the message "what time shall we meet tomorrow?" and then the user named "Kim Gap-dong" answers "let's meet at City Hall," the related-message extractor 113 may extract the message "three o'clock is good" including time information for the keyword "when" as the related message and may extract the message "let's meet at City Hall" including place information for the keyword "where" as the related message.

The list of messages may include messages that the above-described user has communicated with a plurality of conversational partners including a partner to whom the user intends to send a message. Accordingly, the list of messages may include conversations with the plurality of conversational partners, which are recorded in the database 117.

For example, assume that a user named "Kim Gap-dong," a user named "Park Eul-sun," and a user named "Hong Gil-dong" are supposed to have dinner together on Sep. 28, 2015, the user named "Kim Gap-dong" and the user named "Hong Gil-dong" had a conversation about "dinner menu" on Sep. 27, 2015, and the user named "Kim Gap-dong" sent a message "Hong Gil-dong said to me that he would decide the dinner menu" to the user named "Park Eul-sun" on Sep. 27, 2015. In this case, when the user named "Park Eul-sun" sends a message "What is the dinner menu?" to the user named "Kim Gap-dong," the related-message extractor 113 may use the keyword "dinner menu?" extracted by keyword extractor 112 to extract the message "Hong Gil-dong told me that he would decide the dinner menu" as a related message associated with the keyword "dinner menu." The keyword extractor 112 may extract a keyword from the related message again. For example, the keyword extractor 112 may extract "Hong Gil-dong," which is a user name, from the message "Hong Gil-dong said to me that he would decide the dinner menu" as the keyword. The related-message extractor 113 may use the key word "Hong Gil-dong" or "dinner menu" extracted by the keyword extractor 112 to extract a message "today's dinner menu is Pizza!" transmitted by the user named "Hong Gil-dong" to the user named "Kim Gap-dong" from a conversation between the user named "Kim Gap-dong" and the user named "Hong Gil-dong" about "dinner menu."

When the keyword is an entity keyword including multimedia, the related-message extractor 113 may extract a related message using the entity keyword. For example, when the entity keyword is a photograph, the related-message extractor 113 may search a list of messages that the user and the plurality of conversational partners have communicated with each other in the database 117 to extract a message including a photograph similar to the photograph that is the entity keyword as the related message. In this case, various techniques may be used for the related-message extractor 113 to extract the related message using the entity. For example, when the entity is an image, the related-message extractor 113 may extract a related message using an image search technique and an image similarity determination technique using metadata, tag data or the like of an image file.

The message linker 114 according to an example embodiment links related messages extracted by the related-message extractor 113 to the keyword by a hyperlink.

The hyperlink according to one or more example embodiments is used to link a message associated with a keyword contained in a specific message to the keyword. When the keyword is selected, the hyperlink may be activated. When the hyperlink is activated, a message associated with the keyword may be displayed on a screen.

The message linker 114 may set up a hyperlink for a keyword contained in an input message or a summary message and may insert identification information of the related message associated with the keyword into attributes of the hyperlink. The identification information of the related message inserted into the attributes of the hyperlink may include an ID of a chat room and an ID of each message.

When the input message or the summary message includes an entity keyword, the message linker 114 may set up the entity with a hyperlink and may insert the identification information of the related message associated with the entity keyword into the attributes of the hyperlink.

The first provider 115 according to an example embodiment may provide a message having a hyperlink inserted by the message linker 114 to the first user terminal 200. That is, for example, before providing a message to the second user terminal 300, the first provider 115 may provide a complete message to the first user terminal 200 in order for the user to perform a final review of the message.

When the first receiver 111 receives an input message from the first user terminal 200, the first provider 115 may provide an input message to which a keyword indicator and a hyperlink are added to the first user terminal 200. In this case, by activating the hyperlink, the user may determine suitability of the hyperlink; that is, for example, whether the key word and the related message are suitably linked to each other. The first receiver 111 may receive a message transmission request signal from the first user terminal 200. The message transmission request signal may include corrections for the keyword indicator and the hyperlink added to the input message.

When the first receiver 111 receives identification information of one or more messages to be summarized, which are contained in a list of messages, from the first user terminal 200, the first provider 115 may provide a summary message to which the keyword indication and the hyperlink are added to the first user terminal 200. In this case, the first receiver 111 may receive a message transmission request signal including corrections for an order of keywords included in the summary message or an additional message added to the summary message from the first user terminal 200. The user may also determine suitability of the hyperlink by activating the hyperlink. When the hyperlink is corrected, the correction may be performed by newly inserting the hyperlink into a message that is corrected and selected by the user.

The second provider 116 according to an example embodiment transmits a message including the hyperlink to the second user terminal 300 according to the message transmission request signal received from the first user terminal 200.

Example embodiments of a method and apparatus for controlling a message to which a hyperlink is added and controlling display of a related message using a control device 310 included in the second user terminal 300 will be described below.

For convenience of description, the first user terminal 200 and the second user terminal 300 are conceptually distinct from each other. The first user terminal 200 and the second user terminal 300 may be a terminal having the same configuration. Accordingly, any description of the second user terminal 300 may be used to describe the first user terminal 200.

The control device 310 according to an example embodiment may correspond to or include one or more processors. Thus, the control device 310 may be driven while being included in another hardware device such as a microprocessor or a general computer system.

The control device 310 according to an example embodiment includes a second receiver 311 and a controller 312.

The second receiver 311 according to an example embodiment receives a message to which the hyperlink is added from the first user terminal 200 through the message providing apparatus 110. Here, the related message may be extracted from a message transmission/reception history between the first user terminal 200 and the second user terminal 300 or from a message transmission/reception history between the first user terminal 200 and a plurality of terminals.

When a hyperlink included in a keyword of a message received by the second receiver 311 (hereinafter, referred to as a received message) is activated by a user input, the controller 312 according to an example embodiment displays a related message associated with the keyword. In this case, the controller 312 may perform display control of a screen variably depending on whether the related message is transmitted or received between conversational partners or extracted from a conversation with a third party.

For example, when the related message associated with the received message is written by a sender (e.g., a user of the first user terminal 200) or a user (e.g., a user of the second user terminal 300) of the received message, the controller 312 may perform control to display a process of scrolling to a part in which the related message is present in a graphic user interface (GUI) in which the sender (e.g., the user of the first user terminal 200) and the user (e.g., the user of the second user terminal 300) of the received message conduct a conversation and may perform control to highlight the related message.

The scrolling process denotes displaying a process of moving the screen displayed on the GUI in which the conversation is conducted from a region in which the received message is displayed to a region in which the related message is displayed by using continuous animation.

For example, assume that a user named "Kim Gap-dong" and a user named "Park Eul-sun" have a conversation about "time and place of tomorrow's appointment," and then the user named "Park Eul-sun" summarizes the conversation about "time and place of tomorrow's appointment," and transmits a summary message "9/28/2015/City Hall/3 PM" to the user named "Kim Gap-dong."

In this case, when the user named "Kim Gap-dong" activates a hyperlink included in "3 PM," and a related message associated with "3 PM" is a message "three o'clock is good," the related message is written by the sender (e.g., the user of the first user terminal 200) or the user (e.g., the user of the second user terminal 300) of the received message. Accordingly, the controller 312 may perform control to display a process of scrolling to a part in which the message "three o'clock is good," is present and highlight the message "three o'clock is good."

In order to enhance the legibility of the related message, the controller 312 may perform control to display the remaining messages other than the related message from the communication history separately from the related message in another example embodiment of a method. For example, the controller 312 may perform control to perform at least one of blurring, black and white processing, and fading on the remaining messages other than the related message and then display the processed messages.

When the related message linked by the hyperlink included in the keyword of the received message is deleted from the second user terminal 300, the controller 312 may perform control to receive a corresponding related message from the server 100 and display the received related message on the second user terminal 300. In detail, when the related message linked by a hyperlink is deleted from the second user terminal 300, the controller 312 cannot perform control to display the related message. Thus, the controller 312 may perform control to receive the related message from the database 117 included in the server 100 and display the related message on the second user terminal 300. In this case, there may be a time interval between a message that has been displayed in a graphic user interface in which the conversation is conducted and a related message that is downloaded from the server again. Therefore, when the flow of conversation is interrupted, the controller 312 may display a mismatch to inform that the flow of conversation is interrupted.

When the related message associated with the received message is not written by the sender (e.g., the user of the first user terminal 200) or the user (e.g., the user of the second user terminal 300) of the received message, the controller 312 may perform control to display a pop-up window including the related message in the graphic user interface (GUI) in which a conversation between the sender (e.g., the user of the first user terminal 200) and the user (e.g., the user of the second user terminal 300) of the received message is conducted.

For example, assume that a user named "Kim Gap-dong," a user named "Park Eul-sun," and a user named "Hong Gil-dong" are supposed to have dinner together, the user named "Kim Gap-dong" and the user named "Hong Gil-dong" had a conversation about "dinner menu," and the user named "Park Eul-sun" asks the user named "Kim Gap-dong" about the dinner menu. In this case, the controller 312 may perform control to display some messages of the conversation between the user named "Kim Gap-dong" and the user named "Hong Gil-dong" about the dinner menu in the GUI in which a conversation between the user named "Park Eul-sun" and the user named "Kim Gap-dong" is conducted, in the form of a pop-up window.

The reason why the controller 312 displays the related message associated with the received message in the pop-up window when the related message is not written by the sender (e.g., the user of the first user terminal 200) or the user (e.g., the user of the second user terminal 300) of the received message is to protect individual privacy and also that the movement through scrolling is impossible because the related message is not a transmission/reception message between conversational partners. However, even in this case, the controller 312 may perform control to display a process of scrolling in a chat room for a third party and some of the conversational partners and highlight the related message according to authority settings or the like.

When the related message associated with the received message is not written by the sender (e.g., the user of the first user terminal 200) or the user (e.g., the user of the second user terminal 300) of the received message, the controller 312 may request the server 100 to transmit a conversation sharing permission request to a terminal (not shown) of a third party, who is the writer of the related message. In this case, the server 100 may transmit a conversation sharing permission request to the terminal (not shown) of the third party, receive information regarding permission for sharing from the third party, and determine whether to provide the related message according to the received information.

For example, as described above, assume that a message of a third party named "Hong Gil-dong" included in a conversation between a user named "Kim Gap-dong" and the third party named "Hong Gil-dong" is extracted as the related message through a specific keyword during a conversation between the user named "Kim Gap-dong" and the user named "Park Eul-sun."

In this case, when the user named "Park Eul-sun" reads the related message hyperlinked to the specific keyword, the controller 312 may transmit, to the server 100, a request to send a sharing permission message for a conversation of the user named "Park Eul-sun." However, a time at which the request to send the sharing permission message for the conversation is transmitted to the server 100 is not limited thereto, and the related-message extractor 113 may transmit the sharing permission message when extracting the related-message associated with the keyword.

The server 100 may transmit, to the terminal of the third party named "Hong Gil-dong," the sharing permission request including information regarding the conversation that is requested to be shared, in addition to information regarding a conversational partner (e.g., "Park Eul-sun") who has requested the sharing. When the third party named "Hong Gil-dong" accepts the sharing of the conversation, the server 100 may receive the acceptance of the sharing from the terminal of the third party named "Hong Gil-dong" and may provide the related message to the terminal of "Park Eul-sun" according to the received acceptance information. In this case, the server 100 may provide the related message and also information regarding a writer who has written the related message, a time of writing, and a chat room in which the related message is written to the terminal of "Park Eul-sun."

Even when the related message associated with the received message is written by the sender (e.g., the user of the first user terminal 200) or the user (e.g., the user of the second user terminal 300) of the received message, the controller 312 may perform control to display the related message in the form of a pop-up window.

When there are a plurality of keywords and related messages included in the received message, the controller 312 may perform control to sequentially display the plurality of related messages in the order of the plurality of keywords in the received message.

For example, when the received message is "9/28/2015/City Hall/3 PM," the controller 312 may perform control to sequentially display a related message about "9/28/2015," a related message about "City Hall," and a related message about "3 PM."

In this case, the controller 312 may sequentially display the related messages through a scrolling GUI or a pop-up window in the order of keywords.

On a condition that the related message associated with the received message is a message including a hyperlink (hereinafter, referred to as a second hyperlink), when the second hyperlink is activated by an input of the user (e.g., the user of the second user terminal 300), the controller 312 may perform control to further display a related message (hereinafter referred to as a second related message) linked by the second hyperlink.

For example, assume that a user named "Park Eul-sun" transmits a message "what is the dinner menu today?" to a user named "Kim Gap-dong" and a related message for the keyword "dinner menu" is the message "Hong Gil-dong told me that he would decide the dinner menu" of the user named "Kim Gap-dong." In this case, when the related message associated with the keyword "Hong Gil-dong" of the message "Hong Gil-dong told me that he would decide the dinner menu," is a message "today's dinner menu is Pizza!" sent to the user named "Kim Gap-dong" by "Hong Gil-dong," the controller 312 may perform control to display the received message "what is today's dinner menu?" the related message "Hong Gil-dong told me that he would decide the dinner menu," and the second related message "Today's dinner menu is Pizza!" Even in this case, the controller 312 may sequentially display the related messages through a scrolling GUI or a pop-up window in the order of keywords.

On a condition that the second related message displayed by a second hyperlink is a message including a hyperlink (hereinafter, referred to as a third hyperlink), when the third hyperlink is activated by an input of the user (e.g., the user of the second user terminal 300), the controller 312 may perform control to further display a related message (hereinafter referred to as a third related message) linked by the third hyperlink.

The controller 312 may perform control to display all related messages associated with the related message until a hyperlink is not included in the related messages associated with the related message.

When the related messages such as a first related message associated with a related message and a second related message associated with the first related message are linked in series by a hyperlink, the controller 312 may perform control to display the plurality of related messages linked in series in various methods.

As an example, whenever a hyperlink included in each related message is activated by an input of the user, the controller 312 may perform control to display a related message associated with the related message.

When the plurality of related messages are linked in series by a hyperlink as described above, the controller 312 may perform control to display a search interface for returning to "previous related message," "next related message," and "initial message." When there are a plurality of related messages, the user may often need to be aware of the content of the message in comparison with the previous or next related message or the initial message. The controller 312 may perform control to display the previous related message, the next related message, or the initial message according to an input of the user through the search interface. Furthermore, the controller 312 may perform control to display thumbnails of the plurality of related messages and may intuitively switch between the displayed related messages.

As another example, the controller 312 may perform control to display the related messages all at once without activation of a hyperlink by an input of the user. In this case, the controller 312 may perform control to display the plurality of related messages in time series according to time elapsed.

The message providing apparatus 110 according to another example embodiment may be included in the first user terminal 200. In the above-described example embodiment the message providing apparatus 110 is included in a server. In this example embodiment, the first user terminal 200 serves to receive an input message or a message to be summarized from a user, transmit the message to the server 100, and receive a result processed by the server 100.

In this example embodiment, the message providing apparatus 110 is included in the first user terminal 200. The server 100 may serve to relay messages between the first user terminal 200 and the second user terminal 300.

In more detail, for example, the message providing apparatus 110 according to another example embodiment extracts a keyword from an input message entered by the user, searches a list of messages that the user has communicated with a conversational partner or a third party, and extracts a related message associated with the extracted keyword. In this case, a method of the keyword extractor 112 according to the above-described example embodiment extracting a keyword, and a method of the related-message extractor 113 extracting a related message using the extracted keyword, may be used as a method of extracting a keyword and extracting a related message associated with the extracted keyword. However, the message providing apparatus 110 searches a list of messages stored in the first user terminal 200 rather than the server 100.

The message providing apparatus 110 according to another example embodiment may link the extracted related message to the extracted keyword by a hyperlink and display the hyperlink on a display of the first user terminal 200.

The message providing apparatus 110 according to another example embodiment may transmit the input message or summary message to the second user terminal 300 in addition to its related messages according to a message transmission request of a user. In this case, the server 100 may serve to relay messages between the first user terminal 200 and the second user terminal 300.

Subsequently, a method in which the control device 310 included in the second user terminal 300 displays the received message is the same or substantially the same as that in the above-described example embodiment, and thus, its description will be omitted.

Figure 3:
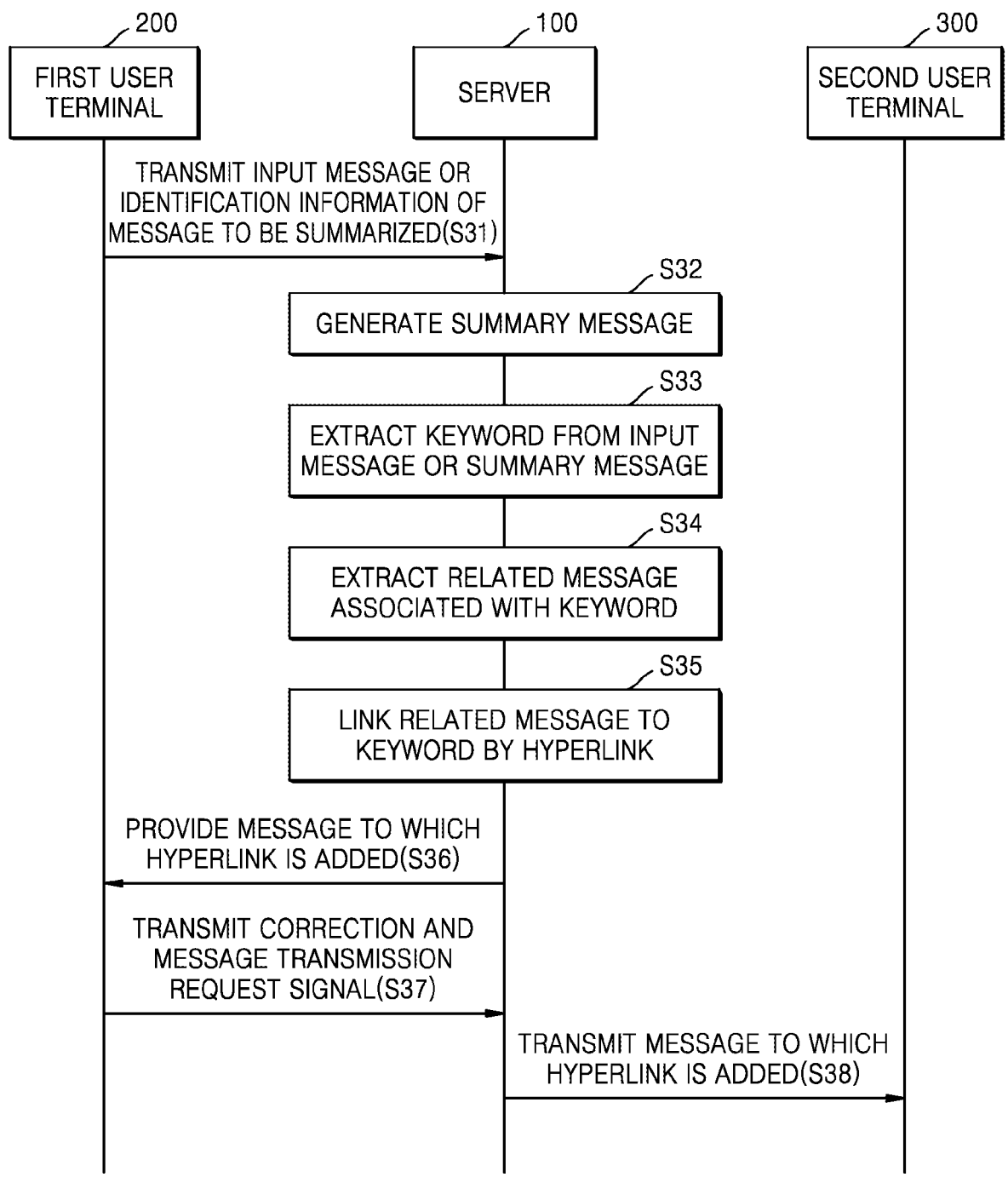
FIG. 3 is a flowchart showing a message providing method according to an example embodiment.

FIG. 3 is a flowchart showing a message providing method according to an example embodiment. Referring to FIG. 3, a flowchart of an information processing method among a server 100, a first user terminal 200, and a second user terminal 300 is shown. The message providing apparatus 110 of FIG. 2 may be included in the server 100 of FIG. 3. Thus, the description of the message providing apparatus 110 with reference to FIG. 2 may be applied to that of FIG. 3 although the description will be omitted below.

Referring to FIG. 3, the first user terminal 200 transmits an input message or identification information of a message to be summarized to the server 100 (S31). Here, the input message may include text or a multimedia entity including a character string. The message to be summarized includes one or more messages contained in a list of messages that a user has communicated with a plurality of conversational partners, and may include text or a multimedia entity including a character string, like the input message. Also, the identification information may include an ID of a chat room, and an ID of each message.

Upon receiving the identification information of the message to be summarized from the first user terminal 200 in S31, the server 100 summarizes one or more messages to be summarized on the basis of the identification information to generate a summary message (S32). In more detail, for example, the server 100 may summarize one or more messages checked in a database 117 on the basis of the identification information to generate a summary message.

The server 100 extracts a keyword from the input message received from the first user terminal 200 in S31 or the summary message generated in S32 (S33). In this case, various techniques as described above may be used for the server 100 to extract the keyword from the message.

Subsequently, the server 100 searches a list of messages that a user has communicated with a plurality of conversational partners in the database 117 to extract a related message associated with the keyword extracted in S33 (S34). In this case, various techniques as described above may be used for the server 100 to extract the related message associated with the keyword. For example, the server 100 may extract a message including the keyword extracted in S33 or a message including a word corresponding to the keyword extracted in S33 as the related message associated with the keyword.

The server 100 links the related-message extracted in S34 to the keyword by a hyperlink (S35). That is, for example, the server 100 links the keyword contained in the input message or the summary message by a hyperlink and inserts identification information of the related message associated with the keyword into attributes of the hyperlink.

The server 100 provides a message to which the hyperlink generated in S36 is added to the first user terminal 200. In this case, the server 100 may receive a correction of the order of keywords of the message or an additional message added to the message from the first user terminal 200. The user may determine suitability of the hyperlink by activating the hyperlink.

The server 100 transmits a message including the hyperlink to the second user terminal 300 according to a message transmission request signal received from the first user terminal 200 (S38).

Figure 4:
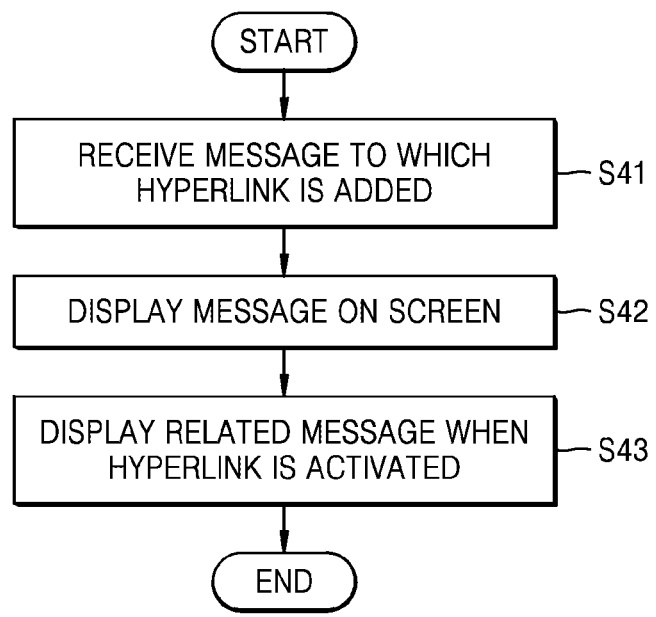
FIG. 4 is a flowchart showing a message display control method according to an example embodiment.

FIG. 4 is a flowchart showing a display control method according to an example embodiment. The display control method of FIG. 4 may be performed by the control device 310 included in the second user terminal 300 of FIG. 3. Accordingly, the description of the control device 310 with reference to FIG. 3 may be applied to that in FIG. 4 although the description will be omitted below.

Referring to FIG. 4, the second user terminal 300 contains a keyword and receives a message in which the keyword and a related message associated with the keyword are linked by a hyperlink from the server 100 (S41). For example, the second user terminal 300 receives, from the server 100, a message in which a keyword contained in an input message or a summary message is hyperlinked and in which identification information of the related message associated with the keyword is inserted into attributes of the hyperlink.

The second user terminal 300 displays the message received in S41 on a screen (S42). For example, the second user terminal 300 may display a message received from the server 100 on a display included in the second user terminal 300. In this case, the second user terminal 300 may display the keyword to which the hyperlink is added separately from another word in the message. For example, the second user terminal 300 may underline and/or blue-highlight the keyword to which the hyperlink is added, like typical hyperlinks, and then display the underlined and/or blue-highlighted keyword.

When the hyperlink is activated by an input of the user, the second user terminal 300 displays the related message (S43). For example, when a hyperlink activation request signal of a user is input to the second user terminal 300, the second user terminal 300 may display the related message on the basis of the identification information of the related message inserted into the attributes of the hyperlink.

In this case, the second user terminal 300 may determine whether the related message is written by a sender (e.g., a user of the first user terminal 200) or a user (e.g., a user of the second user terminal 300) of the received message and may variously perform display control of the screen.

FIGS. 5A to 8C show example screens that are displayed in a first user terminal 200 or a second user terminal 300 according to an example embodiment.

Figure 5A:
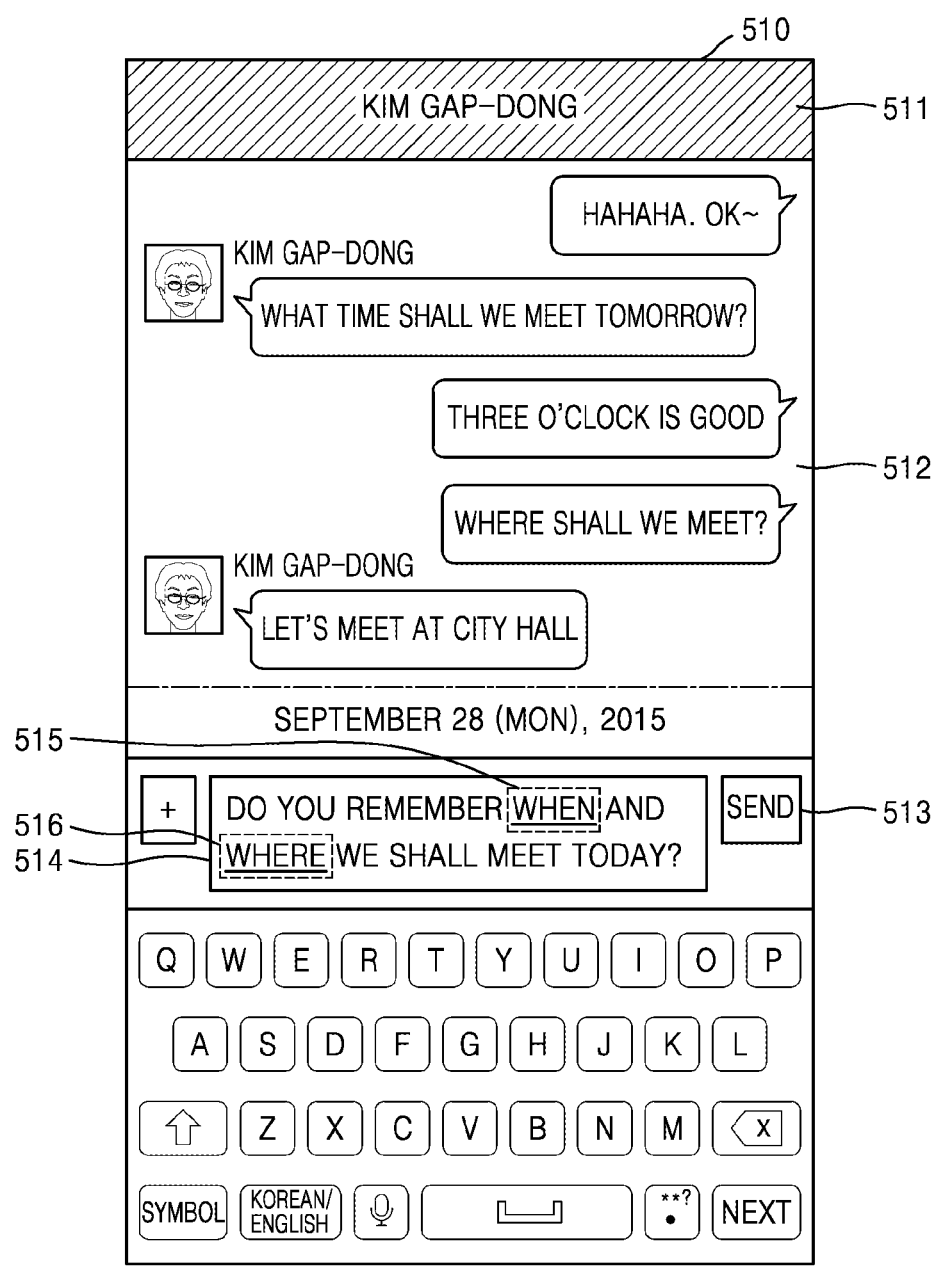
FIG. 5A shows an example screen in which a user enters a message to be transmitted from a user terminal into a second user terminal.

FIG. 5A shows an example screen 510 in which a user enters a message to be transmitted to the second user terminal 300 into the first user terminal 200.

Referring to FIG. 5A, the screen 510 in which a message is entered may include a conversational partner display window 511 in which a conversational partner is displayed, a chat window 512 in which existing conversations are displayed, a send button 513 for transmitting a message, and an input window 514 for entering a message to be transmitted. Here, the input window 514 may include indications 515 and 516 of hyperlinked keywords.

FIG. 5A shows an example in which, while a user has a conversation with a conversational partner named "Kim Gap-dong," a keyword "when" 515 and a keyword "where" 516 are highlighted.

Figure 5B:
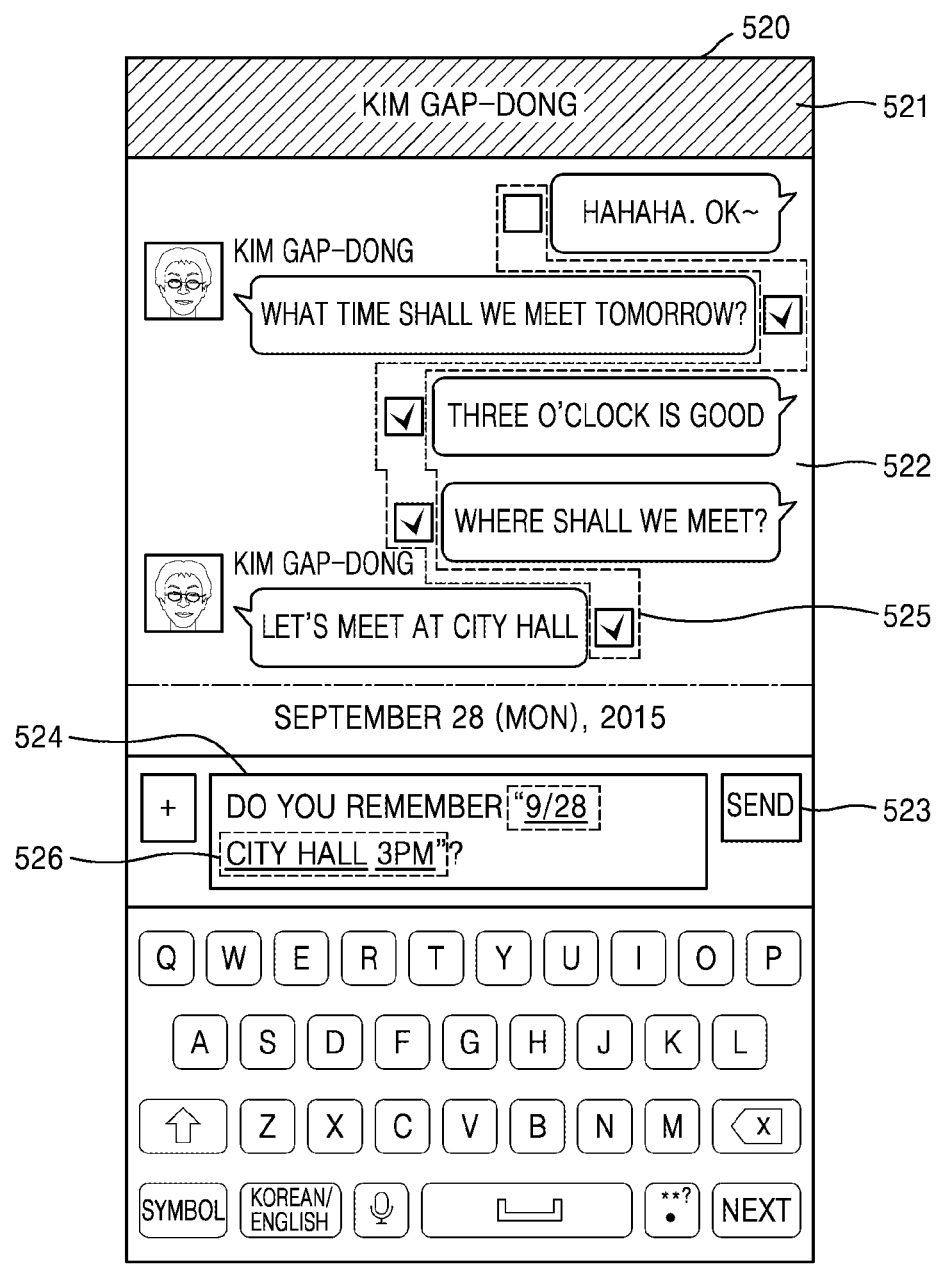
FIG. 5B shows an example screen in which a user selects a plurality of messages to be summarized and then transmitted to a second user terminal from a user terminal.

FIG. 5B shows an example screen 520 in which a user selects one or more messages to be summarized and transmitted to the second user terminal 300 from the first user terminal 200.

Referring to FIG. 5B, the screen 520 in which the message to be summarized is selected may include a conversational partner display window 521 in which a conversational partner is displayed, a chat window 522 in which existing conversations are displayed, a send button 523 for transmitting a message, and an input window 524 for entering a message to be transmitted. Here, the chat window 522 may include a check box 525 for selecting the summarization-designated message from among the existing conversations. In addition, a summary message 526 summarized by the server 100 may be displayed in the input window 524 on the basis of messages selected by the user from the chat window 522. Here, the screen 520 may provide an interface for receiving a correction of the summary message. That is, for example, the user may change the order of keywords by dragging any one keyword in the summary message displayed in the input window 524, correct the content of the summary message using a keypad, or change a message into which a hyperlink is to be inserted.

FIG. 5B shows an example screen in which, while a user has a conversation with a conversational partner named "Kim Gap-dong, the server 100 summarizes four messages checked by the user from the chat window 522 and displays the summary message 526 such as "9/28 City Hall 3 PM" in the input window 524 of the first user terminal 200. Furthermore, in the example, the user enters an additional message "do you remember the appointment?" into the input window 524 in addition to the summary message 526.

Figure 6:
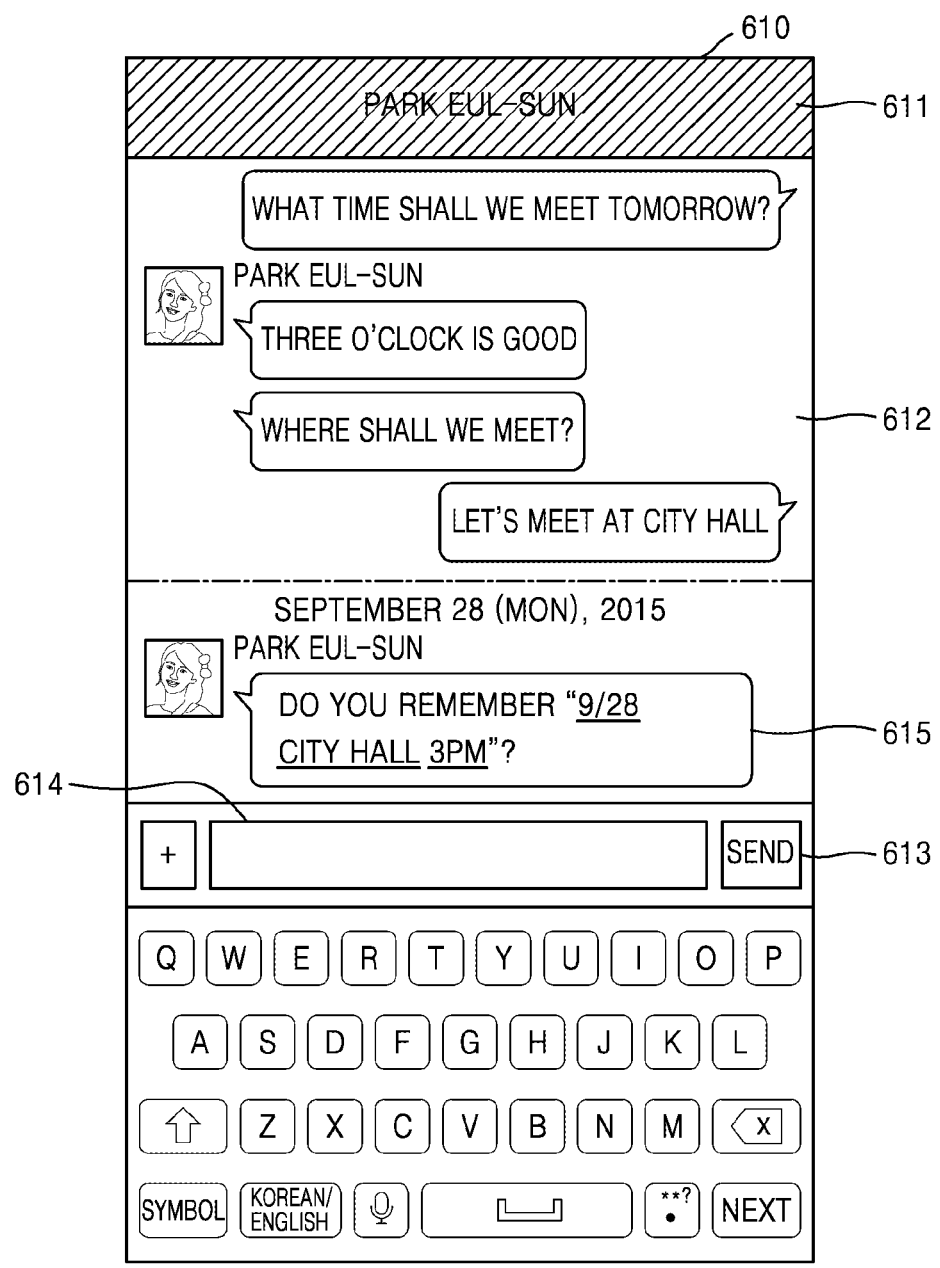
FIG. 6 shows an example screen of a second user terminal that receives and displays a message hyperlinked with a related message associated with a keyword.

FIG. 6 shows an example screen of a second user terminal 300 that receives and displays a message hyperlinked with a related message associated with a keyword. FIG. 6 shows the above-description of FIG. 5 in the situation of a recipient "Kim Gap-dong."

Referring to FIG. 6, a message display screen 610 may include a conversational partner display window 611 in which a conversational partner is displayed, a chat window 612 in which existing conversations are displayed, a send button 613 for transmitting a message, and an input window 614 for entering a message to be transmitted. The chat window 612 may display a message 615 hyperlinked with a related message. The chat window 612 may underline and/or blue-highlight the keyword to which the hyperlink is added, and then display the underlined and/or highlighted keyword.

FIG. 6 shows an example in which the keywords "9/28," "City Hall," and "3 PM" are hyperlinked while "Park Eul-sun" transmits the summary message.

Figure 7A:
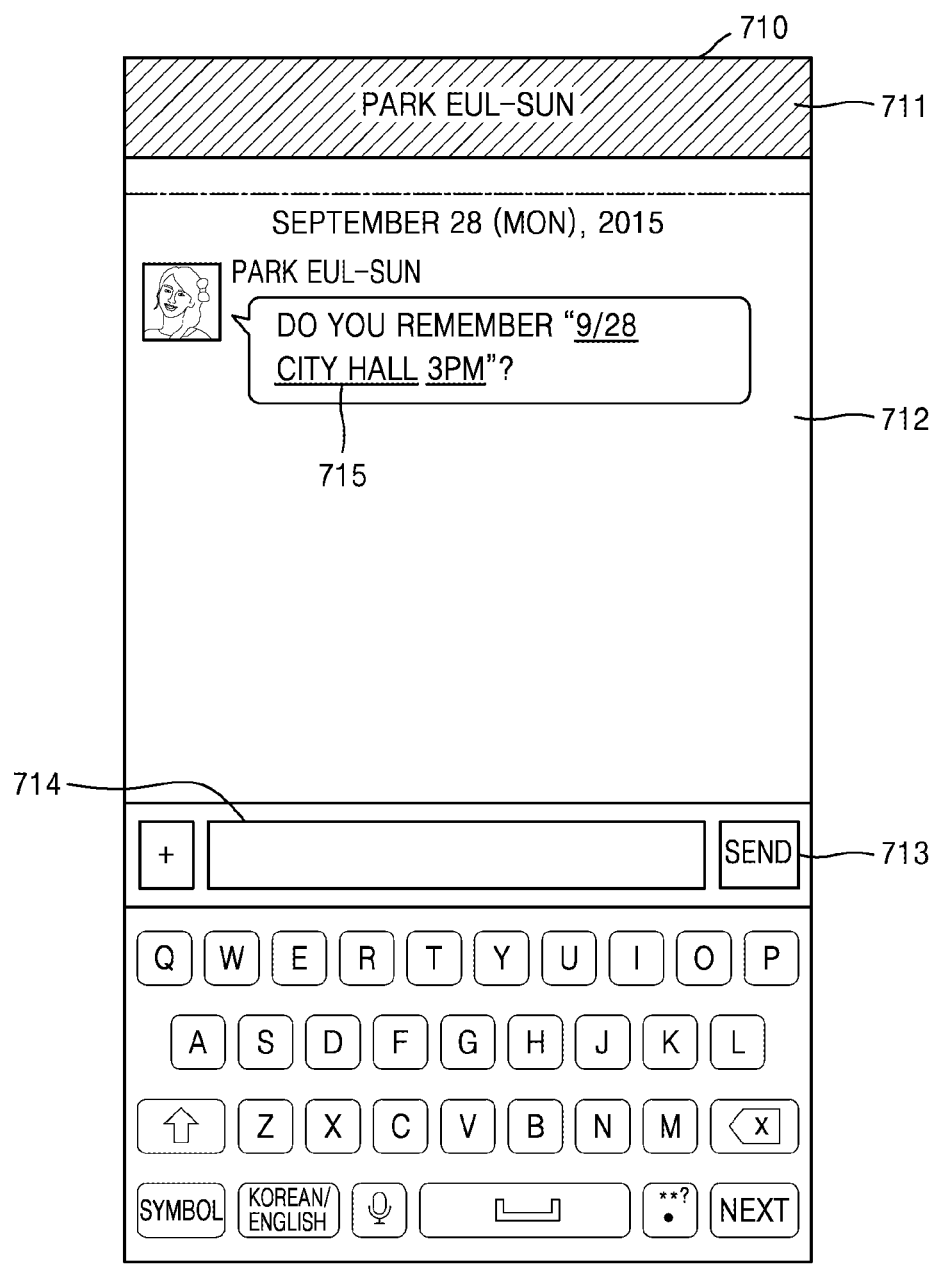
FIG. 7A shows an example screen in which a message including a hyperlink is received.
Figure 7B:
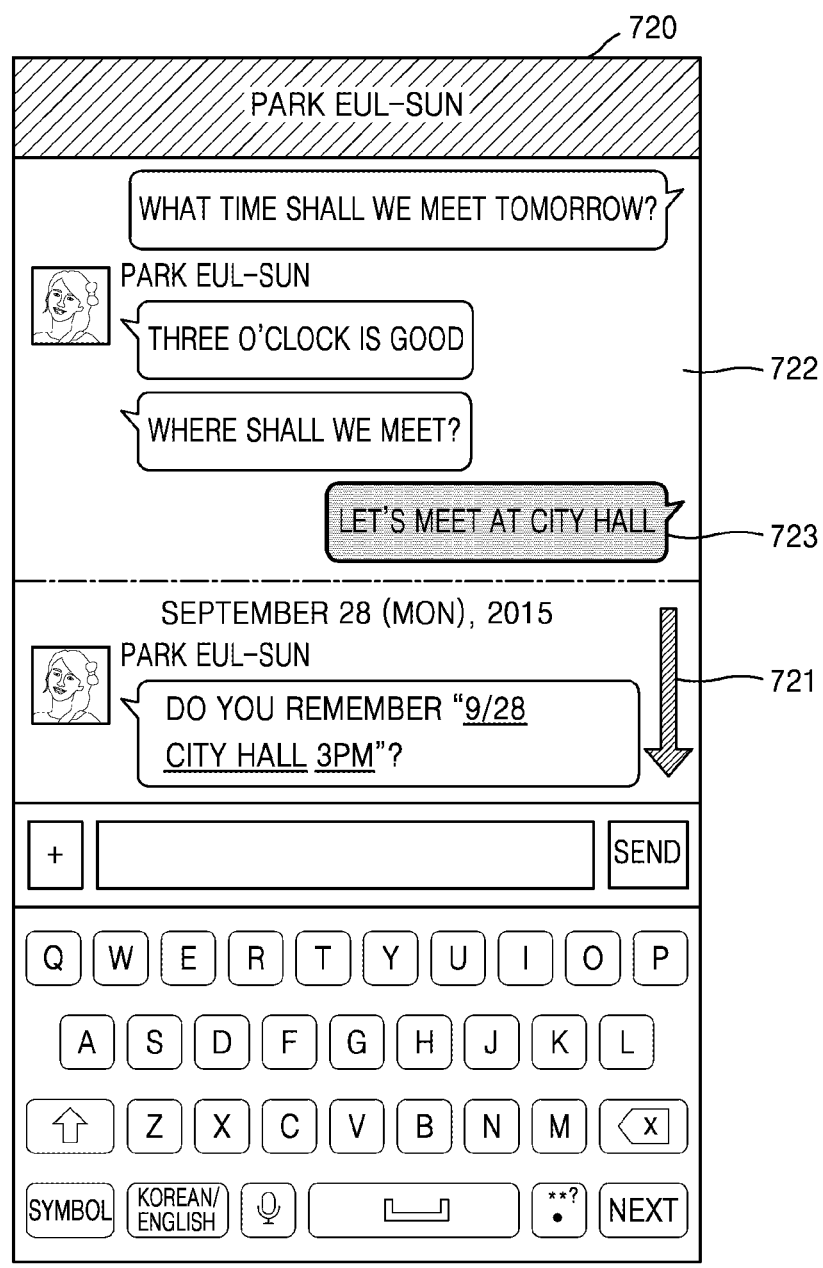
FIG. 7B shows an example screen in which a related message is scrolled and displayed when a hyperlink added to a keyword of FIG. 7A is activated.
Figure 7C:
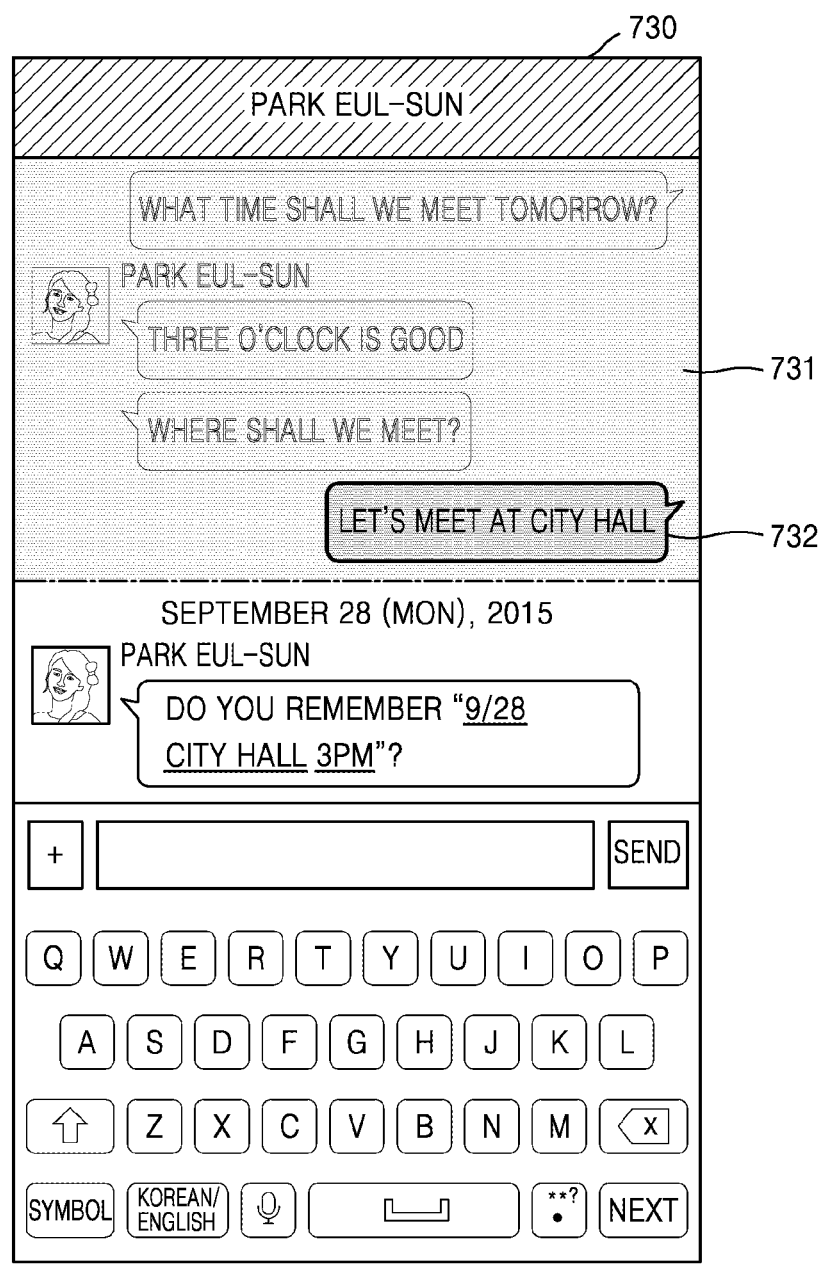
FIG. 7C shows an example screen in which a visual effect is provided to a related message of FIG. 7B.

FIGS. 7A to 7C show example screens in which a related message is scrolled and displayed when a hyperlink added to a keyword is activated in a second user terminal 300.

FIG. 7A shows an example screen 710 in which a message including a hyperlink is received.

Referring to FIG. 7A, a message reception screen 710 may include a conversational partner display window 711 in which a conversational partner is displayed, a chat window 712 in which existing conversations are displayed, a send button 713 for transmitting a message, and an input window 714 for entering a message to be transmitted.

FIG. 7A shows an example in which the keywords "Sept 28" and "3 PM" are highlighted in addition to the keyword "City Hall" 715 while "Park Eul-sun" transmits the summary message.

FIG. 7B shows an example screen 720 in which a related message is scrolled and displayed when a user activates a hyperlink added to the keyword "City Hall" 715 of FIG. 7A.

Referring to FIG. 7B, when the hyperlink is activated by the user, the controller 312 of FIG. 2 scrolls the chat window 722 so that the related message 723 is displayed in the chat window 722. In this case, the controller 312 may control display such that a screen is switched as existing conversations move down (e.g., in a direction 721). For example, when a user activates a hyperlink added to the keyword "City Hall" 715 of FIG. 7A, a screen may be switched such that a message "Let's meet at City Hall," which is the related message 723, is placed at the center of the chat window 722. However, example embodiments are not limited thereto. It will be appreciated that a controller (e.g., a display controller) 312 may scroll a screen to place a related message 723 at the top or bottom of the chat window 722.

FIG. 7C shows an example screen 730 in which a visual effect is provided to a related message of FIG. 7B.

Referring to FIG. 7C, the screen 730 may include an indication 731 so that a related message 732 is distinct from the remaining messages other than the related message 732. Furthermore, the screen 730 may include a blinking indication, a blurring indication, or the like for the related message.

FIG. 7C shows an example in which the remaining messages other than a message "let's meet at City Hall," which is the related message 732, are blurred 731, i.e., vaguely displayed.

Figure 8A:
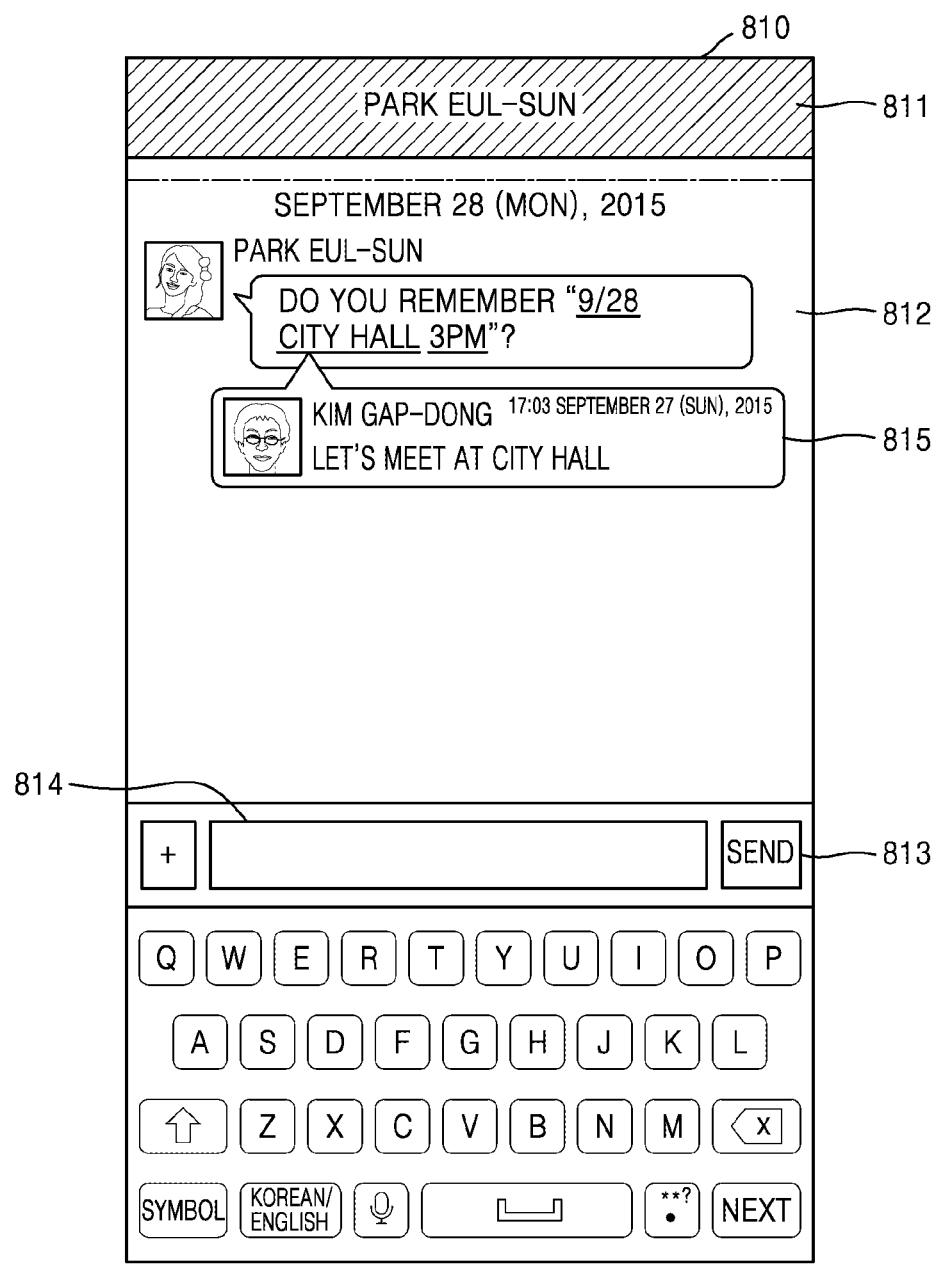
FIG. 8A shows an example screen in which a related message is displayed in a pop-up window when a hyperlink added to a keyword of FIG. 7A is activated.
Figure 8B:
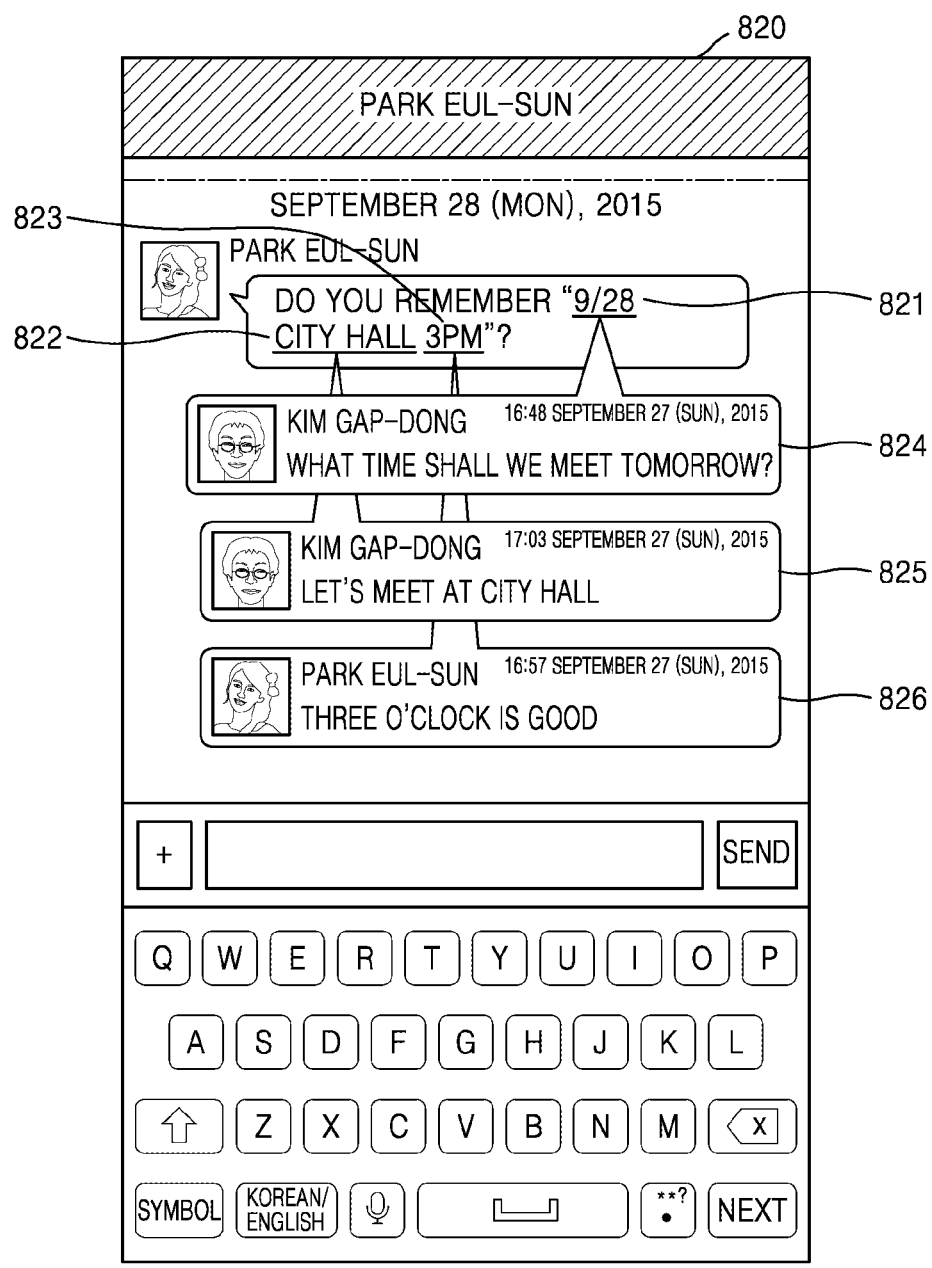
FIG. 8B shows an example screen in which related messages of a plurality of keywords are sequentially displayed.
Figure 8C:
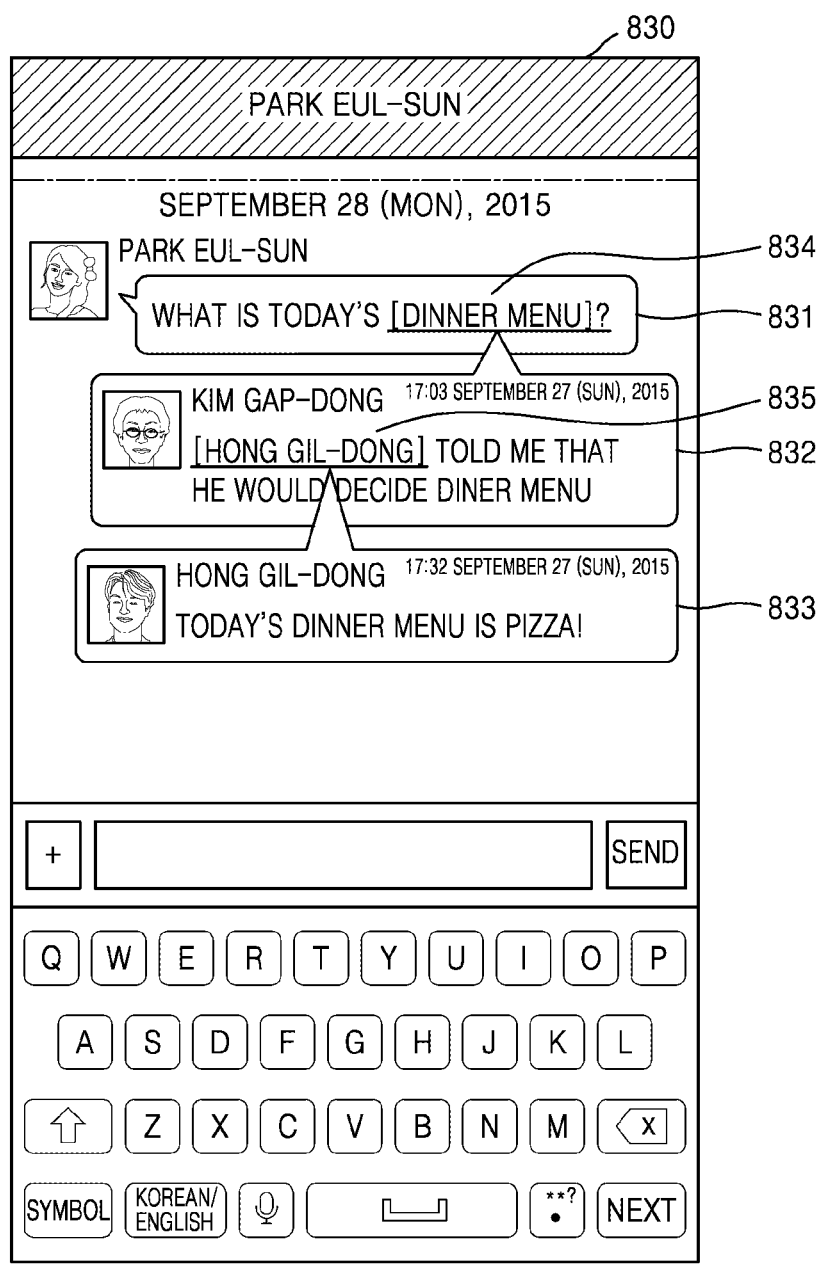
FIG. 8C shows an example screen in which a related message associated with a keyword contained in a related message is displayed.

FIGS. 8A to 8C show example screens in which a related message is displayed in a pop-up window when a hyperlink added to a keyword is activated in a second user terminal 300.

FIG. 8A shows an example screen 810 in which a related message is displayed in a pop-up window when a hyperlink added to the keyword "City Hall" 715 of FIG. 7A is activated.

Referring to FIG. 8A, the screen 810 may include a conversational partner display window 811 in which a conversational partner is displayed, a chat window 812 in which existing conversations are displayed, a send button 813 for transmitting a message, and an input window 814 for entering a message to be transmitted. In addition, the screen 810 may include a pop-up window 815 in which a related message is displayed when a hyperlink is activated by a user.

FIG. 8A shows in an example in which a related message "let's meet at City Hall" of the hyperlink added to the keyword "City Hall" is displayed in the pop-up window 815.

FIG. 8B shows an example screen 820 in which related messages of a plurality of keywords are sequentially displayed.

Referring to FIG. 8B, when there are a plurality of keywords and related messages included in the summary message, the controller 312 of FIG. 2 may display a plurality of related messages in the order of the plurality of keywords. In this case, the screen 820 may display the pop-up windows of the related messages sequentially in the order of keywords, while an animation effect is given over time, or at the same or substantially the same time.

FIG. 8B shows an example in which a related message "what time shall we meet tomorrow?" 824, a related message "let's meet at City Hall" 825, and a related message "three o'clock is good" 826 are displayed in the order of a keyword "Sept 28" 821, a keyword "City Hall" 822, and a keyword "3 PM" 823.

FIG. 8B shows an example in which pop-up windows of the three related messages 824, 825, and 826 are displayed separately. However, example embodiments are not limited thereto. For example, the three related messages 824, 825, and 826 may be arranged and displayed in one pop-up window. In this case, an order in which the related messages are arranged may correspond to an order of keywords in the summary message.

FIG. 8C shows an example screen 830 in which a related message associated with a keyword contained in a related message is displayed.

Referring to FIG. 8C, the screen 830 may include an indication of a first related message 832 of a keyword 834 included in a received message 831 and also an indication of a second related message 833 of a keyword 835 included in the first related message 832. That is, for example, when a hyperlink for a keyword "dinner menu" 834 included in the received message 831 is activated, the screen 830 may display the first related message 832 of the keyword 834 in a pop-up window. Likewise, when a hyperlink for a keyword "Hong Gil-dong" 835 included in the first related message 832 is activated, the screen 830 may display a second related message 833 of the keyword "Hong Gil-dong" 835 in a pop-up window.

According to one or more example embodiments, it is possible to extract a keyword from a message input by a user, extract a related message associated with the keyword, and provide the related message to a message recipient in addition to the input message.

According to one or more example embodiments, it is also possible to summarize one or more conversations to generate a summary message, and provide a related message associated with a keyword contained in the summary message to a recipient in addition to the summary message.

According to one or more example embodiments, it is possible to provide various user interfaces for enhancing the legibility of the related message associated with the received message.

As mentioned above, example embodiments described herein may be implemented in the form of a program instruction that is executable through various computer components and recordable on a computer-readable recording medium. Examples of the computer-readable recording medium include a magnetic medium such as a hard disk, a floppy disk, or a magnetic tape, an optical medium such as a compact disc-read only memory (CD-ROM) or a digital versatile disc (DVD), a magneto-optical medium such as a floptical disk, and a hardware device such as a ROM, a RAM, or a flash memory that is specially designed to store and execute program instructions. Furthermore, the computer-readable recording medium may include a non-transitory medium that may be transmitted over a network, for example, a medium that is implemented in the form of software or an application and thus is transmitted and distributed over a network.

The computer program may be designed and configured specially for the embodiments or be known and available to those skilled in computer software. Examples of the computer program include a high-level language code executable by a computer with an interpreter, in addition to a machine language code made by a compiler.

The particular implementations shown and described herein are illustrative examples of embodiments and are not intended to otherwise limit the scope of embodiments in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device. Moreover, no item or component is essential to the practice of embodiments unless the element is specifically described as "essential" or "critical."

While example embodiments have been disclosed herein, it should be understood that other variations may be possible. Such variations are not to be regarded as a departure from the spirit and scope of embodiments of the present application, and all such modifications as would be obvious to one skilled in the art are intended to be included within the scope of the following claims.

What is claimed is:

1. A non-transitory computer-readable storage medium storing computer-executable instructions that, when executed by processing circuitry, cause the processing circuitry to perform a message providing method comprising:
    receiving, from a user terminal through a graphical user interface associated with a chatroom, identification information of a plurality of messages from among a list of messages;
    summarizing the plurality of messages based on the identification information to generate a summary message;
    extracting a keyword from the summary message;
    searching the list of messages to extract a related message associated with the keyword, the messages in the list of messages communicated between a user and a conversational partner or between the user or the conversational partner and a third party;
    linking the related message to the keyword by a hyperlink; and
    presenting the summary message with the hyperlink through an input window for the chatroom.

2. The non-transitory computer-readable storage medium of claim 1, wherein the message providing method further comprises:
    linking the related message to the keyword to provide the summary message to the user terminal.

3. The non-transitory computer-readable storage medium of claim 2, wherein the message providing method further comprises:
    receiving a correction of the summary message from the user terminal.

4. The non-transitory computer-readable storage medium of claim 2, wherein the message providing method further comprises:
    receiving a message transmission request signal from the user terminal; and
    transmitting the summary message including the hyperlink to another user terminal in response to the message transmission request signal.

5. The non-transitory computer-readable storage medium of claim 1, wherein the message providing method further comprises:
    providing the summary message to the user terminal.

6. The non-transitory computer-readable storage medium of claim 1, wherein the identification information includes at least one of an identifier of each of the plurality of messages or an identifier of the chatroom in which the messages are communicated between the user and the conversational partner or between the user or the conversational partner and the third party.

7. A message providing apparatus comprising:
  processing circuitry configured to execute computer-readable instructions such that the processing circuitry is configured to
    receive, from a user terminal through a graphical user interface associated with a chatroom, identification information of a plurality of messages from among a list of messages,
    summarize the plurality of messages based on the identification information to generate a summary message,
    extract a keyword from the summary message,
    search the list of messages to extract a related message associated with the keyword, the messages in the list of messages communicated between a user and a conversational partner or between the user or the conversational partner and a third party,
    link the related message to the keyword by a hyperlink, and
    present the summary message with the hyperlink through an input window for the chatroom.

8. The message providing apparatus of claim 7, wherein the processing circuitry is configured to execute computer-readable instructions such that the processing circuitry is further configured to provide the summary message to the user terminal.

9. The message providing apparatus of claim 8, further comprising:
  a receiver configured to receive a correction of the summary message from the user terminal.

10. The message providing apparatus of claim 9, wherein
  the receiver is further configured to receive a message transmission request signal from the user terminal; and
  the processing circuitry is configured to execute computer-readable instructions such that the processing circuitry is further configured to transmit the summary message including the hyperlink to another user terminal in response to the message transmission request signal.

11. A message providing method comprising:
  receiving, from a user terminal through a graphical user interface associated with a chatroom, identification information of a plurality of messages from among a list of messages;
  summarizing the plurality of messages based on the identification information to generate a summary message;
  extracting a keyword from the summary message;
  searching the list of messages to extract a related message associated with the keyword, the messages in the list of messages communicated between a user and a conversational partner or between the user and a third party;
  linking the related message to the keyword by a hyperlink; and
  presenting the summary message with the hyperlink through an input window for the chatroom.

* * * * *